United States Patent
Bear et al.

(10) Patent No.: US 7,913,182 B2
(45) Date of Patent: Mar. 22, 2011

(54) METHOD AND SYSTEM FOR AUXILIARY DISPLAY OF INFORMATION FOR A COMPUTING DEVICE

(75) Inventors: Eric Gould Bear, Issaquah, WA (US); Chad Magendanz, Issaquah, WA (US); Aditha May Adams, Seattle, WA (US); Carl Ledbetter, Mercer Island, WA (US); Steve Kaneko, Medina, WA (US); Chris Schoppa, Redmond, WA (US); Adrian Chandley, Sammamish, WA (US); William J. Westerinen, Sammamish, WA (US); Dale C. Crosier, Kirkland, WA (US); Robert Scott Plank, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 11/509,437

(22) Filed: Aug. 23, 2006

(65) Prior Publication Data

US 2007/0195007 A1 Aug. 23, 2007

Related U.S. Application Data

(62) Division of application No. 10/429,932, filed on May 5, 2003, now Pat. No. 7,221,331.

(51) Int. Cl.
*G06F 9/44* (2006.01)
*G09G 5/00* (2006.01)
*H04B 1/38* (2006.01)
(52) U.S. Cl. ........... 715/778; 345/1.1; 345/1.3; 455/566
(58) Field of Classification Search ................. 715/778; 345/1.1, 1.3; 455/566
See application file for complete search history.

(56) References Cited

U.S. PATENT DOCUMENTS

| 4,860,342 A | 8/1989 | Danner .................... 379/96 |
| 5,159,445 A | 10/1992 | Gitlin |
| 5,388,268 A | 2/1995 | Beach |

(Continued)

FOREIGN PATENT DOCUMENTS

EP 0772327 A2 5/1997

(Continued)

OTHER PUBLICATIONS

Fox et al., "Integrating information appliances into an interactive workspace", 2000, IEEE Computer Graphics and Applications, vol. 20,Iss.3;p. 65-65.*

(Continued)

*Primary Examiner* — William L Bashore
*Assistant Examiner* — Jordany Núñez
(74) *Attorney, Agent, or Firm* — Workman Nydegger

(57) ABSTRACT

A method and system for auxiliary display of information for a computing device. An auxiliary display is integrated with a computing system to provide an area where notifications can be peripherally presented off-screen. Whenever a background task sends a notification to the main display of the system, the notification may be redirected to appear instead on the auxiliary display. A user may then glance at the notification appearing on the auxiliary display to be informed of the message without interruption from the current task onscreen. Any type of information may be presented on the auxiliary display including incoming communications, meeting reminders, system alerts, and information from Internet subscription services. The auxiliary display may be placed on the central processor chassis or on the monitor border along with LED indicator lights to provide simple peripheral-vision notification. By pressing a button, a user may obtain additional detailed follow-up information.

21 Claims, 13 Drawing Sheets

U.S. PATENT DOCUMENTS

| | | | |
|---|---|---|---|
| 5,412,417 A | 5/1995 | Tozuka | |
| 5,487,181 A | 1/1996 | Dailey | |
| 5,491,800 A | 2/1996 | Goldsmith | |
| 5,519,722 A | 5/1996 | Akman | |
| 5,533,115 A | 7/1996 | Hollenbach | |
| 5,546,538 A | 8/1996 | Cobbley | |
| 5,568,540 A | 10/1996 | Grecko | 379/88.25 |
| 5,657,414 A | 8/1997 | Lett | |
| 5,675,374 A | 10/1997 | Kohda | 348/14.1 |
| 5,675,810 A | 10/1997 | Sellers | |
| 5,732,216 A | 3/1998 | Logan | |
| 5,745,761 A | 4/1998 | Celi | |
| 5,764,901 A | 6/1998 | Skarbo | |
| 5,768,164 A | 6/1998 | Hollon | |
| 5,802,305 A | 9/1998 | McKaughan | |
| 5,831,606 A | 11/1998 | Nakajima | |
| 5,907,604 A | 5/1999 | Hsu | |
| 5,959,622 A | 9/1999 | Greer | |
| 5,978,837 A * | 11/1999 | Foladare et al. | 709/207 |
| 5,987,106 A | 11/1999 | Kitamura | |
| 5,991,822 A | 11/1999 | Mealy | |
| 5,991,836 A | 11/1999 | Renda | |
| 5,999,613 A | 12/1999 | Nabkel | |
| 6,006,285 A | 12/1999 | Jacobs | |
| 6,008,806 A | 12/1999 | Nakajima | |
| 6,052,442 A | 4/2000 | Cooper et al. | 379/88.19 |
| 6,101,610 A | 8/2000 | Beebe | |
| 6,118,856 A | 9/2000 | Paarsmark | |
| 6,144,363 A | 11/2000 | Alloul | 345/618 |
| 6,144,644 A | 11/2000 | Bajzath et al. | 370/259 |
| 6,160,550 A | 12/2000 | Nakajima | |
| 6,172,703 B1 | 1/2001 | Lee | 348/14.08 |
| 6,208,373 B1 | 3/2001 | Fong et al. | 348/14.16 |
| 6,215,420 B1 | 4/2001 | Harrison et al. | 341/22 |
| 6,237,846 B1 | 5/2001 | Lowell | |
| 6,240,168 B1 | 5/2001 | Stanford et al. | 379/110.01 |
| 6,266,714 B1 | 7/2001 | Jacobs | |
| 6,279,056 B1 | 8/2001 | Jacobs | |
| 6,282,435 B1 | 8/2001 | Wagner et al. | 455/566 |
| 6,346,934 B1 * | 2/2002 | Wugofski | 345/158 |
| 6,362,440 B1 | 3/2002 | Karidis | |
| 6,380,968 B1 | 4/2002 | Alexander | |
| 6,390,371 B1 | 5/2002 | Armga | |
| 6,417,849 B2 | 7/2002 | Lefebvre | |
| 6,438,216 B1 | 8/2002 | Aktas | |
| 6,438,585 B2 | 8/2002 | Mousseau | |
| 6,453,027 B1 | 9/2002 | Kang | |
| 6,483,905 B1 | 11/2002 | Kikinis | 379/93.24 |
| 6,484,019 B1 | 11/2002 | Aklian | |
| 6,496,860 B2 | 12/2002 | Ludtke | |
| 6,507,356 B1 | 1/2003 | Jackel et al. | 348/14.06 |
| 6,513,128 B1 | 1/2003 | Wang | |
| 6,516,356 B1 | 2/2003 | Belknap | |
| 6,518,957 B1 | 2/2003 | Lehtinen | 345/173 |
| 6,519,335 B1 | 2/2003 | Bushnell | |
| 6,546,262 B1 | 4/2003 | Freadman | |
| 6,603,855 B1 | 8/2003 | Cannon et al. | 379/377 |
| 6,628,194 B1 | 9/2003 | Hellebust | 340/7.5 |
| 6,628,267 B2 | 9/2003 | Karidis | |
| 6,658,095 B1 | 12/2003 | Yoakum | |
| 6,671,356 B2 | 12/2003 | Lewis | 379/88.13 |
| 6,671,743 B1 | 12/2003 | Verity | 709/321 |
| 6,674,457 B1 | 1/2004 | Davies | |
| 6,680,845 B2 | 1/2004 | Agata | |
| 6,690,778 B2 | 2/2004 | Kahn | |
| 6,691,233 B1 | 2/2004 | Gannage | |
| 6,718,183 B1 | 4/2004 | Blust | |
| 6,731,316 B2 | 5/2004 | Herigstad et al. | 715/864 |
| 6,732,365 B2 | 5/2004 | Belknap | |
| 6,741,232 B1 | 5/2004 | Siedlikowski | 345/156 |
| 6,757,372 B1 | 6/2004 | Dunlap et al. | 379/142 |
| 6,806,867 B1 | 10/2004 | Arruda | |
| 6,816,881 B1 | 11/2004 | Mohindra | |
| 6,819,961 B2 | 11/2004 | Jacobs | |
| 6,831,657 B2 | 12/2004 | Tsutsumi et al. | 345/589 |
| 6,882,326 B2 | 4/2005 | Hirayama | 345/1.1 |
| 6,888,562 B2 | 5/2005 | Rambo et al. | 348/14.16 |
| 6,892,074 B2 | 5/2005 | Tarkiainen | 455/466 |
| 6,897,851 B2 | 5/2005 | Carini | |
| 6,902,332 B2 | 6/2005 | McLoone | 400/472 |
| 6,912,283 B2 | 6/2005 | Meyerson et al. | 379/428.04 |
| 6,918,123 B1 | 7/2005 | Shteyn | |
| 6,937,950 B2 | 8/2005 | Cragun | |
| 6,938,174 B2 | 8/2005 | LeKuch | |
| 6,970,556 B2 | 11/2005 | Wall et al. | 379/355.01 |
| 6,973,167 B2 | 12/2005 | Kikinis | 379/67.1 |
| 6,976,216 B1 | 12/2005 | Peskin et al. | 715/716 |
| 6,980,641 B1 | 12/2005 | Stanford et al. | 379/387 |
| 6,996,445 B1 | 2/2006 | Kamijo | 700/94 |
| 7,000,237 B1 | 2/2006 | Sinha | |
| 7,036,110 B2 | 4/2006 | Jeyaraman | |
| 7,068,641 B1 | 6/2006 | Allan | |
| 7,085,814 B1 | 8/2006 | Gandhi | |
| 7,096,391 B2 | 8/2006 | Johnson | |
| 7,106,472 B2 | 9/2006 | Gomez | |
| 7,123,370 B2 | 10/2006 | Watanabe | |
| 7,221,331 B2 | 5/2007 | Bear | |
| 7,227,511 B2 | 6/2007 | Adan | |
| 7,231,229 B1 | 6/2007 | Hawkins | |
| 7,243,130 B2 | 7/2007 | Horvitz | |
| 7,272,660 B1 | 9/2007 | Powers | |
| 7,292,588 B2 | 11/2007 | Milley | |
| 7,302,637 B1 | 11/2007 | Maguire | |
| 7,376,932 B2 | 5/2008 | Chen | |
| 7,401,053 B2 | 7/2008 | Kamimura | |
| 7,519,911 B2 | 4/2009 | Friedman | |
| 2001/0034251 A1 | 10/2001 | Goto | |
| 2001/0040551 A1 * | 11/2001 | Yates et al. | 345/156 |
| 2002/0004855 A1 | 1/2002 | Cox | |
| 2002/0015020 A1 * | 2/2002 | Mobin | 345/156 |
| 2002/0019812 A1 * | 2/2002 | Board et al. | 705/51 |
| 2002/0080967 A1 | 6/2002 | Abdo | |
| 2002/0087225 A1 | 7/2002 | Howard | |
| 2002/0099456 A1 * | 7/2002 | McLean | 700/83 |
| 2002/0114430 A1 | 8/2002 | Murata | |
| 2002/0131072 A1 | 9/2002 | Jackson | |
| 2002/0140627 A1 * | 10/2002 | Ohki et al. | 345/1.1 |
| 2002/0144191 A1 | 10/2002 | Lin | |
| 2002/0167458 A1 | 11/2002 | Baudisch | |
| 2002/0167460 A1 | 11/2002 | Baudisch | |
| 2003/0021290 A1 * | 1/2003 | Jones | 370/466 |
| 2003/0025674 A1 | 2/2003 | Watanabe | |
| 2003/0037180 A1 * | 2/2003 | Madineni et al. | 709/321 |
| 2003/0046448 A1 | 3/2003 | Fischer | |
| 2003/0069689 A1 | 4/2003 | Ihara | |
| 2003/0074590 A1 | 4/2003 | Fogle | |
| 2003/0112325 A1 * | 6/2003 | Boyden et al. | 348/14.16 |
| 2003/0118003 A1 | 6/2003 | Geck | |
| 2003/0122874 A1 | 7/2003 | Dieberger | |
| 2003/0131148 A1 * | 7/2003 | Kelley et al. | 717/101 |
| 2003/0146903 A1 | 8/2003 | Yi | |
| 2003/0188041 A1 * | 10/2003 | Fillmore | 709/318 |
| 2003/0197685 A1 | 10/2003 | Yi | |
| 2003/0227471 A1 | 12/2003 | Eglit | |
| 2004/0001087 A1 | 1/2004 | Warmus | |
| 2004/0027375 A1 | 2/2004 | Ellis | |
| 2004/0052341 A1 | 3/2004 | Yeh | |
| 2004/0103144 A1 | 5/2004 | Sallam | |
| 2004/0110490 A1 | 6/2004 | Steele | |
| 2004/0114032 A1 * | 6/2004 | Kakii | 348/14.08 |
| 2004/0128359 A1 * | 7/2004 | Horvitz et al. | 709/207 |
| 2004/0135819 A1 | 7/2004 | Maa | |
| 2004/0141012 A1 * | 7/2004 | Tootill | 345/827 |
| 2004/0155956 A1 * | 8/2004 | Libbey | 348/14.16 |
| 2004/0177361 A1 | 9/2004 | Bernhard | |
| 2004/0210628 A1 | 10/2004 | Inkinen | |
| 2004/0222977 A1 * | 11/2004 | Bear | 340/815.4 |
| 2004/0222978 A1 | 11/2004 | Bear | 345/172 |
| 2004/0223058 A1 | 11/2004 | Richter | |
| 2004/0223061 A1 | 11/2004 | Bear | 348/207.1 |
| 2004/0223599 A1 | 11/2004 | Bear | 379/215.01 |
| 2004/0225502 A1 | 11/2004 | Bear | 704/270 |
| 2004/0225892 A1 | 11/2004 | Bear | 726/2 |
| 2004/0225901 A1 | 11/2004 | Bear | 713/300 |
| 2004/0240167 A1 | 12/2004 | Ledbetter | 361/683 |
| 2004/0240650 A1 | 12/2004 | Bear | 455/426.1 |
| 2004/0266426 A1 | 12/2004 | Marsh | |

| | | | |
|---|---|---|---|
| 2005/0005067 A1 | 1/2005 | Culter | |
| 2005/0068423 A1 | 3/2005 | Bear | 345/156 |
| 2005/0069101 A1 | 3/2005 | Bear | 379/90.01 |
| 2005/0071437 A1 | 3/2005 | Bear | 713/1 |
| 2005/0071626 A1 | 3/2005 | Bear | 713/1 |
| 2005/0182822 A1 | 8/2005 | Daniel | |
| 2005/0186942 A1 | 8/2005 | Griffin | |
| 2005/0193396 A1 | 9/2005 | Stafford-Fraser | |
| 2005/0259032 A1 | 11/2005 | Morris | |
| 2005/0262302 A1 | 11/2005 | Fuller | |
| 2006/0007051 A1 | 1/2006 | Bear | 345/1.1 |
| 2006/0048062 A1 | 3/2006 | Adamson | |
| 2006/0061516 A1 | 3/2006 | Campbell | |
| 2006/0095525 A1 | 5/2006 | Mousseau | |
| 2006/0100978 A1 | 5/2006 | Heller | |
| 2006/0130072 A1 | 6/2006 | Rhote | |
| 2006/0130075 A1 | 6/2006 | Rhoten | 719/328 |
| 2006/0164324 A1 | 7/2006 | Polivy | 709/206 |
| 2006/0168355 A1 | 7/2006 | Shenfield et al. | |
| 2006/0236221 A1 | 10/2006 | McCausland | |
| 2006/0242590 A1 | 10/2006 | Polivy | |
| 2006/0284787 A1 | 12/2006 | Bear | |
| 2009/0259327 A1 | 10/2009 | Bear | |
| 2009/0305695 A1 | 12/2009 | Bear | |
| 2010/0008488 A1 | 1/2010 | Bear | |
| 2010/0010653 A1 | 1/2010 | Bear | |
| 2010/0054432 A1 | 3/2010 | Brahm | |

FOREIGN PATENT DOCUMENTS

| | | | |
|---|---|---|---|
| EP | 0777394 A1 | | 6/1997 |
| EP | 000816990 | | 1/1998 |
| EP | 0838934 A1 | | 4/1998 |
| EP | 0772327 A3 | | 2/1999 |
| JP | 02147642 | | 7/1990 |
| JP | 2001043690 | | 2/2001 |
| JP | 2001100838 | | 3/2001 |
| WO | WO9602049 A1 | | 1/1996 |
| WO | WO0169387 | * | 9/2001 |
| WO | 03/085960 | | 10/2003 |

OTHER PUBLICATIONS

U.S. Appl. No. 11/559,821, filed Nov. 14, 2006, Bear.*
U.S. Appl. No. 11/685,014, filed Mar. 12, 2007, Bear.*
Anonymous, International Search Report in Corresponding EP Application No. EP 04 00 9868.
Oxford On-line Dictionary, http://dictionary.oed.com/entrance.dtl, Oxford University Press 2007, on the definition of the word "physical" under III/7b.
Office Action dated Aug. 8, 2007 cited in related U.S. Appl. No. 10/996,371.
U.S. Appl. No. 11/837,302, filed Aug. 10, 2007, Bear.
Office Action dated Jul. 31, 2007 cited in related U.S. Appl. No. 10/677,084.
Office Action dated Jul. 27, 2007 cited in related U.S. Appl. No. 10/996,557.
Office Action dated Jul. 30, 2007 cited in related U.S. Appl. No. 10/430,369.
Office Action dated Jul. 6, 2007 cited in related U.S. Appl. No. 10/429,943.
Notice of Allowance dated Sep. 7, 2007 cited in related U.S. Appl. No. 10/429,931.
Office Action dated Sep. 24, 2007 cited in related U.S. Appl. No. 10/429,933.
Office Action dated Feb. 15, 2008 cited in related U.S. Appl. No. 10/429,933.
Notice of Allowance dated Jan. 30, 2008 cited in related U.S. Appl. No. 10/429,931.
Office Action dated Mar. 21, 2008 cited in related U.S. Appl. No. 10/966,557.
Office Action dated Feb. 28, 2008 cited in related U.S. Appl. No. 10/966,371.
Office Action dated Sep. 28, 2007 cited in related U.S. Appl. No. 10/429,943.
Office Action dated Mar. 26, 2008 cited in related U.S. Appl. No. 10/428,943.
Office Action dated Mar. 18, 2008 cited in related U.S. Appl. No. 10/677,118.
Office Action dated Oct. 15, 2007 cited in related U.S. Appl. No. 10/429,903.
Notice of Allowance dated Apr. 2, 2008 cited in related U.S. Appl. No. 10/429,903.
Notice of Allowance dated Apr. 23, 2008 cited in related U.S. Appl. No. 10/430,369.
Office Action dated Jan. 11, 2008 cited in related U.S. Appl. No. 10/677,084.
Notice of Allowance dated Apr. 29, 2008 cited in related U.S. Appl. No. 10/677,084.
Office Action dated May 15, 2008 cited in related U.S. Appl. No. 11/837,302.
Office Action dated Aug. 6, 2008 cited in U.S. Appl. No. 10/429,943.
Office Action dated Aug. 20, 2006 cited in U.S. Appl. No. 10/429,933.
Office Action dated Feb. 14, 2007 cited in U.S. Appl. No. 10/429,905.
Office Action dated May 21, 2007 cited in U.S. Appl. No. 10/429,905.
Office Action dated Apr. 4, 2006 cited in U.S. Appl. No. 10/429,930.
Office Action dated Jul. 14, 2006 cited in U.S. Appl. No. 10/429,930.
Office Action dated Nov. 14, 2006 cited in U.S. Appl. No. 10/429,930.
Notice of Allowance dated Mar. 16, 2007 cited in U.S. Appl. No. 10/429,930.
Office Action dated Aug. 9, 2005 cited in U.S. Appl. No. 10/429,932.
Office Action dated Oct. 4, 2005 cited in U.S. Appl. No. 10/429,932.
Office Action dated Mar. 17, 2006 cited in U.S. Appl. No. 10/429,932.
Office Action dated Aug. 15, 2006 cited in U.S. Appl. No. 10/429,932.
Notice of Allowance dated Jan. 25, 2007 cited in U.S. Appl. No. 10/429,932.
Office Action dated Mar. 16, 2006 cited in U.S. Appl. No. 10/677,101.
Office Action dated Sep. 6, 2006 cited in U.S. Appl. No. 10/677,101.
Notice of Allowance dated Feb. 2, 2006 cited in U.S. Appl. No. 10/677,101.
Office Action dated Mar. 26, 2007 cited in U.S. Appl. No. 10/429,931.
Office Action dated Sep. 26, 2006 cited in U.S. Appl. No. 10/430,369.
Office Action dated Mar. 20, 2007 cited in U.S. Appl. No. 10/430,369.
Office Action dated Jan. 3, 2007 cited in U.S. Appl. No. 10/429,903.
Office Action dated Feb. 6, 2007 cited in U.S. Appl. No. 10/429,943.
Office Action dated Jul. 6, 2007 cited in U.S. Appl. No. 10/429,943.
Office Action dated Mar. 6, 2007 cited in U.S. Appl. No. 10/429,933.
Office Action dated Aug. 10, 2005 cited in U.S. Appl. No. 10/677,084.
Office Action dated Jan. 19, 2006 cited in U.S. Appl. No. 10/677,084.
Office Action dated Nov. 1, 2006 cited in U.S. Appl. No. 10/677,084.
Office Action dated Nov. 28, 2008 cited in U.S. Appl. No. 10/677,118.
Office Action dated Jan. 2, 2009 cited in U.S. Appl. No. 11/837,302.
Notice of Allowance dated Feb. 6, 2009 cited in U.S. Appl. No. 10/429,943.
Office Action dated Feb. 20, 2009 cited in U.S. Appl. No. 11/053,186.
Office Action dated Feb. 19, 2009 cited in U.S. Appl. No. 10/996,558.
Office Action dated Oct. 17, 2008 cited in U.S. Appl. No. 11/509,431.
Office Action dated Nov. 6, 2008 cited in U.S. Appl. No. 10/996,557.
Office Action dated Oct. 1, 2008 cited in U.S. Appl. No. 10/996,371.
Office Action dated Nov. 30, 2009 cited in U.S. Appl. No. 11/112,456.
Office Action dated Dec. 24, 2009 cited in U.S. Appl. No. 11/509,431.
Office Action dated Feb. 22, 2010 cited in U.S. Appl. No. 11/509,431.
Office Action dated Mar. 24, 2010 cited in U.S. Appl. No. 10/429,904.
Notice of Allowance dated Mar. 19, 2009 cited in U.S. Appl. No. 10/677,118.
Notice of Allowance dated Mar. 24, 2009 cited in U.S. Appl. No. 11/837,302.
Office Action dated Apr. 3, 2009 cited in U.S. Appl. No. 11/685,014.

Office Action dated Nov. 5, 2008 cited in U.S. Appl. No. 10/996,634.
Notice of Allowance dated Mar. 30, 2009 cited in U.S. Appl. No. 10/996,634.
Notice of Allowance dated Apr. 6, 2009 cited in U.S. Appl. No. 10/429,943.
Notice of Allowance dated Apr. 16, 2009 cited in U.S. Appl. No. 10/996,371.
Office Action dated Apr. 24, 2009 cited in U.S. Appl. No. 11/509,431.
Office Action dated May 12, 2009 cited in U.S. Appl. No. 11/112,456.
Notice of Allowance dated Jul. 21, 2009 cited in U.S. Appl. No. 11/685,014.
Notice of Allowance dated Aug. 27, 2009 cited in U.S. Appl. No. 10/996,558.
Office Action dated Sep. 2, 2009 cited in U.S. Appl. No. 11/053,186.
Office Action dated Sep. 25, 2009 cited in U.S. Appl. No. 11/509,431.
Notice of Allowance dated Oct. 5, 2009 cited in U.S. Appl. No. 10/996,557.
U.S. Appl. No. 10/429,904, Mail Date Aug. 3, 2010, Notice of Allowance.
Office Action dated Apr. 29, 2010 cited in U.S. Appl. No. 12/542,506.
U.S. Appl. No. 11/053,186, Mail Date May 13, 2010, Notice of Allowance.

* cited by examiner

METHOD AND SYSTEM FOR AUXILIARY DISPLAY OF INFORMATION FOR A COMPUTING DEVICE

CROSS REFERENCE TO RELATED APPLICATIONS

The present patent application is a divisional of U.S. patent application Ser. No. 10/429,932, filed May 5, 2003 and hereby incorporated by reference in its entirety.

FIELD OF THE INVENTION

The invention relates generally to computer systems, and more particularly to an improved method and system for display of information for a computing device.

BACKGROUND OF THE INVENTION

Computer software applications and systems provide various information about their status and activities to their users. For example, whenever a new email message arrives, a notification may be displayed on the computer screen or monitor to inform the user. The computer may also make an audible sound to alert the user to look at the computer screen to view the notification. There are other applications such as instant messaging and voicemail that also provide notification of communications. Additionally, there are a number of applications that provide other types of notifications and alerts. For example, a calendar program provides reminders of upcoming meetings. A task manager program sends reminders on tasks with due dates and a status report upon task completion. System components provide notifications of device status, service alerts, and system health. Internet-related services and other network-based communication services also present information in the form of notifications. For example, a user can subscribe to Internet-related services to be notified of headline news, stock quotes, sport scores, weather and other information.

As the use of the computer continues to grow for communication and information applications, the number of notifications and alerts provided to users also continues to increase. In general, users can be conceptually overloaded with these many notifications and alerts. Moreover, notifications that force user interaction, while the user is focused on a particular task, are annoying and distracting. Further, when a user receives a notification during a meeting or other social setting, it can be disruptive for the user to turn to read the notification.

However, users may not necessarily want to turn off notifications during such times, but are not given many options other than to receive them in their current, possibly distracting form, or not receive them at all. For example, although users may disable some notifications and alerts to avoid interruptions while performing the task at hand, this is often an unsatisfactory solution because it can blind users to information about important information, including information related to the current working environment. Other times users have to turn off notifications, such as when walking or driving to a meeting, but are unable to receive information, even though some information such as the meeting location or directions would be helpful. What is desirable is a system and method that provides users with control over notifications and incoming information, along with improved accessibility to those notifications and incoming information.

SUMMARY OF THE INVENTION

Briefly, the present invention provides an auxiliary display for a user to simply and rapidly view information concerning peripheral tasks without distraction or the need to switch operating focus from the current task onscreen. To this end, an auxiliary display is integrated with a computing system to provide a consistent place where notifications can be peripherally presented. Whenever a background task or specially controlled foreground task sends data such as a notification to the main display of the system, the notification may be redirected to appear instead on the auxiliary display. The user may then glance at the notification appearing on the auxiliary display to be informed of the message without significant interruption from the current task at hand. During a meeting or other social setting, a computer user may also discreetly glance at the small display without needing to disrupt the meeting by turning to read a notification from a large monitor, turning on the large monitor, or otherwise interacting with what is presently considered a conventional computer system.

Any type of information may be presented on the auxiliary display including incoming communications, reminders, system alerts, and information from Internet subscription services. The user may configure the computer system to select any of this information, or select only specific content available within an information category. For example, a user may choose to only receive reminders for accepted appointments and tentative appointments from a calendar program. A user may also configure how long specific types of messages are displayed on the auxiliary display, e.g., by adjusting a display period, some notifications may appear transiently, then simply fade away. Other notifications may be set to remain persistently until they are no longer relevant or are handled in some way, such as via the main display.

The auxiliary display may be located in many locations, including placed on the central processor chassis or on the monitor border (e.g., the auxiliary display 703 of FIG. 7) so that display data that can be viewed from a distance. Additionally, LED indicator lights may accompany the auxiliary display to provide simple peripheral-vision notification. Notification lights of this type alert the user to an event without the need for context switching on the main display. The user may obtain additional detailed follow-up information by pressing a button associated with the notification light.

Any computing or communication device with a display can also be used as the auxiliary display. This includes general purpose computers, cell phones, and handheld devices such as a personal digital assistant (PDA). Moreover, a virtual auxiliary display may be implemented within an area of the main display of the computer. For example, a small window, or visible border ringing the screen that changes colors or the like to provide notifications may serve as an auxiliary display. The auxiliary display may include a combination of any of the forms described above.

The auxiliary display allows a user to be more informed of incoming communications and also to be more in control of interruptions from incoming communications. Other advantages will become apparent from the following detailed description when taken in conjunction with the drawings, in which:

DETAILED DESCRIPTION

Exemplary Operating Environment

Figure 1:
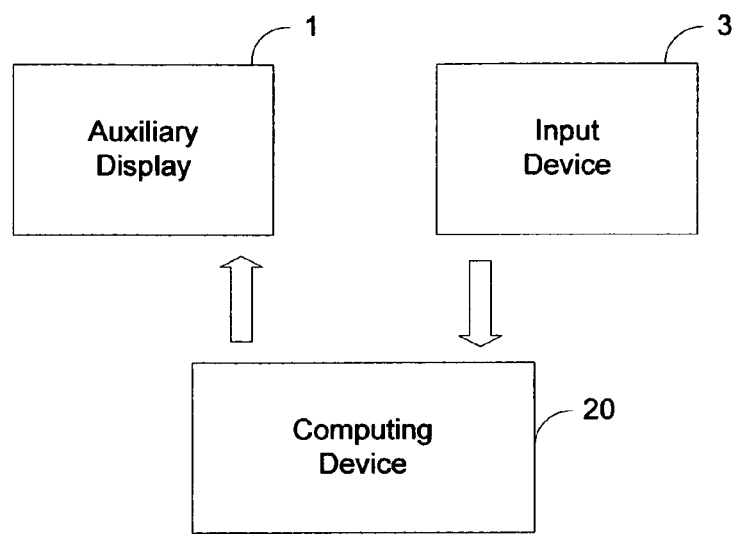
FIG. 1 is a block diagram representing a general architecture of a computing device operative with the auxiliary display of the present invention.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

With reference to FIG. 1, an exemplary system for implementing the invention includes an auxiliary display 1 and an input device 3 which are each connected to a computing device 20 through a serial interface or by other interfaces, such as a parallel port, game port, infrared or wireless connection, universal serial bus (USB) or other peripheral device connection. The auxiliary display 1 may be in the form of any number of known types of displays such as one or more LEDs, a 2-line alphanumeric display, a monochrome display, or a color display. Those skilled in the art will appreciate that the present invention may also use the display of other computing or communication devices as the auxiliary display 1. These other computing or communication devices include general purpose computers, cell phones, and handheld devices such as a pager or a personal digital assistant (PDA). Additionally, the present invention may use a virtual auxiliary display implemented within an area of the onscreen display of the computing device 20 (e.g. a screensaver or a component of the graphical user interface) as the auxiliary display 1. The auxiliary display 1 may include a combination of any of the forms described above, such as one or more LEDs used in conjunction with a virtual auxiliary display.

One or more LEDs may be advantageously used as the auxiliary display 1 for notification about the occurrence of an activity. Such an auxiliary display may be implemented with low costs and less power consumption and provide notification in an unobtrusive manner. It may be effectively used for systems with extremely tight form factors or for systems where communications for users are managed by another person. An auxiliary display may additionally be effective when notifications need to be seen from a distance. An auxiliary display also may be used in conjunction with an onscreen virtual auxiliary display when there is informational content associated with the activity, such as notification of a new email message. In this case, content from the email may also be displayed on the virtual auxiliary display. Furthermore, an auxiliary display may be effectively used for public systems (libraries or kiosks) or shared computers when display of content is undesirable.

Alternatively, a 2-line alphanumeric display may be advantageously used as the auxiliary display 1 where cost or space is critical, but notifications and basic content are desired. It may be effectively used for tablet PCs, laptops, budget PCs, phone docking stations, monitor bezels, and small or low-cost PC appliances or peripherals such as a handset, keyboard, or remote control. It may also be effectively used as a replacement for (and an improvement to) a caller ID box.

Furthermore, a monochrome or color multi-line display may be advantageously used as the auxiliary display 1 for media-rich applications, high-end consumer systems or media center systems. It may be effectively used for high-end laptops with more generous form factors or where an emphasis is placed on communication, full-function PCs with a heavy business or communications emphasis, media centers or high-end media appliances (including remotes, console systems with portable media functionality) and mobile auxiliary displays. Additionally, the display of another computing or communication device may advantageously be used as the auxiliary display 1 where users can expand the role of these supplemental devices when using their PC. These other computing or communication devices include general purpose computers, cell phones, and handheld devices such as a pager or a personal digital assistant (PDA). Further, note that the auxiliary display need not be an actual display, but can be a projection (e.g., onto a wall) of the information. An auxiliary display, as referred herein, may be any visual, audible, or tactile representations.

As mentioned previously, a virtual auxiliary display may be used as the auxiliary display 1 for public systems (libraries or kiosks) or shared computers when display of content is undesirable. It may also be effectively used for low-cost systems or for devices with very minimal form factors that make even LEDs impractical. A virtual auxiliary display may be implemented as a screensaver or as a component of the graphical user interface.

Input device 3 may be a single button that allows the user to switch between different categories of notifications such as email notifications, voicemail notifications, calendar notifications, system status notifications, caller ID lists and other types of notification messages. Accompanying the switch button may also be an up button and a down button to allow the user to scroll forward and backward through the notification messages within a particular category. Those skilled in the art will appreciate that any other input device may be used, such as a keyboard, microphone, joystick, game pad or other device including a device that contains a biometric sensor, environmental sensor, position sensor, or other type of sensor. Any of the input devices of the computing device 20 may be used as the input device 3 that is represented in FIG. 1, or in conjunction with a independent input device 3.

Figure 2:
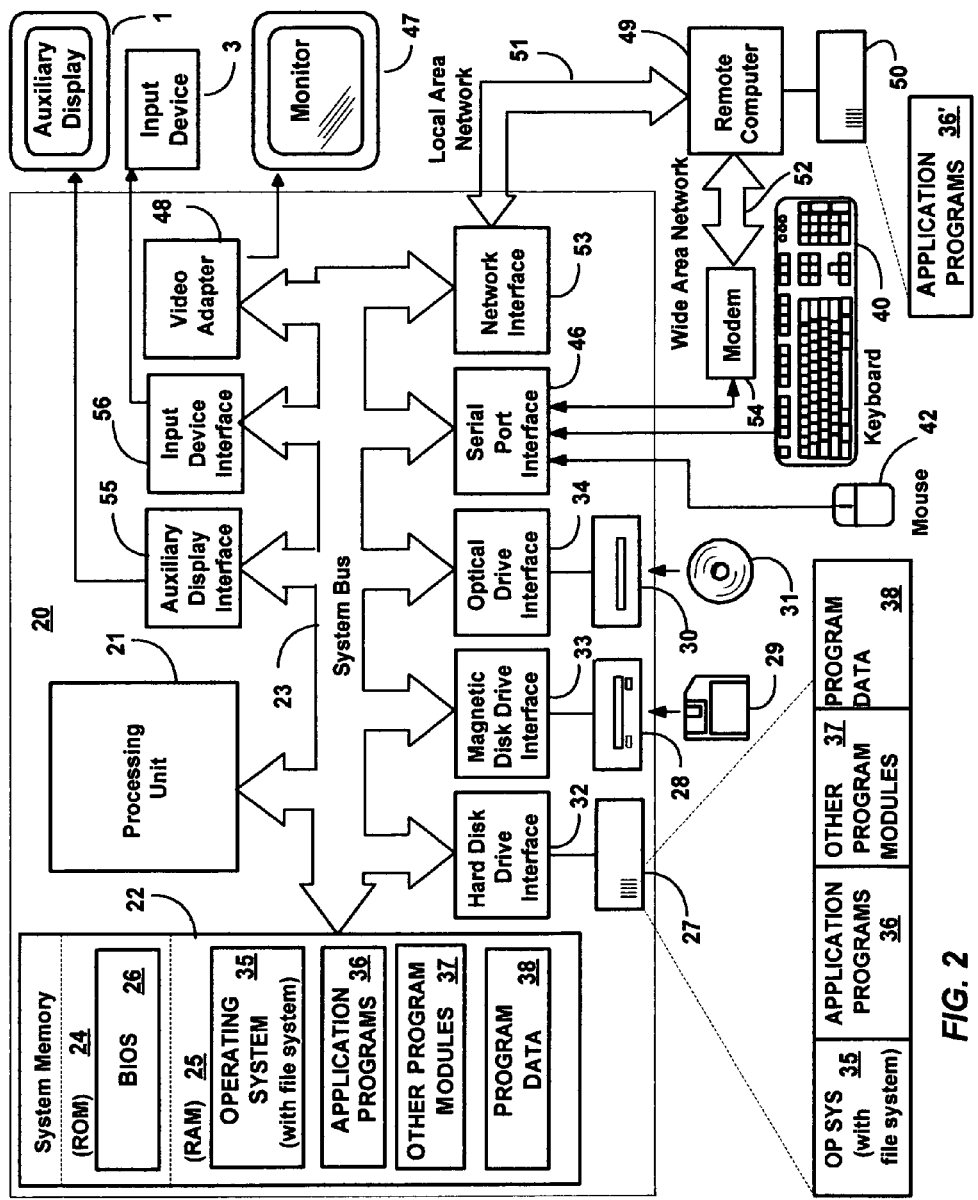
FIG. 2 is a block diagram representing a general purpose computing device in the form of a conventional personal computer system into which the present invention may be incorporated.

FIG. 2 is a block diagram representing the computing device 20 of FIG. 1 in the form of a personal computer system into which the present invention may be incorporated. Those skilled in the art will appreciate that the personal computer system 20 depicted in FIG. 2 is intended to be merely illustrative and that the present invention may be practiced with other computer system configurations, including hand-held devices, multi-processor systems, microprocessor-based or programmable consumer electronics, network PCs, mini-computers, mainframe computers, headless servers and the like. The invention may also be practiced in distributed computing environments where tasks are performed by remote processing devices that are linked through a communications network. In a distributed computing environment, program modules may be located in both local and remote memory storage devices.

The personal computer system 20 included a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary computer system described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary computer system.

A number of program modules may be stored on the hard disk, magnetic disk 29, optical disk 31, ROM 24 or RAM 25, including an operating system 35 (such as Windows® XP), one or more application programs 36 (such as Microsoft® Outlook), other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The auxiliary display 1 described in FIG. 1 is an additional output device connected to the system bus 23 via auxiliary display interface 55, which may be a video adaptor, USB or other peripheral device connection. The input device 3 described in FIG. 1 for controlling the auxiliary display 1 is connected to the system bus 23 via input device interface 56, which may be a serial interface, USB or other peripheral device connection.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Auxiliary Display of Information

As will be understood, the present invention provides an auxiliary display for a user to simply and rapidly view information concerning peripheral tasks without distraction or the need to switch operating focus from the current task onscreen. The user can configure which information appears on the auxiliary display. Although notifications will be used to illustrate the auxiliary display of information, it should be understood that the present invention may provide auxiliary display of other types of information such as from Internet-related services including transaction services, auction services, advertising services, entertainment services, and location services. Such services can provide a wide variety of information including financial transaction information, headline news, stock quotes, sport scores, weather and other information, including information specifically requested by the user as well as unsolicited information. It will also be appreciated that the auxiliary display may be operative using any number of known types of displays such as a set of notification lights, a 2-line alphanumeric display, a monochrome display, or a color display.

Figure 3:
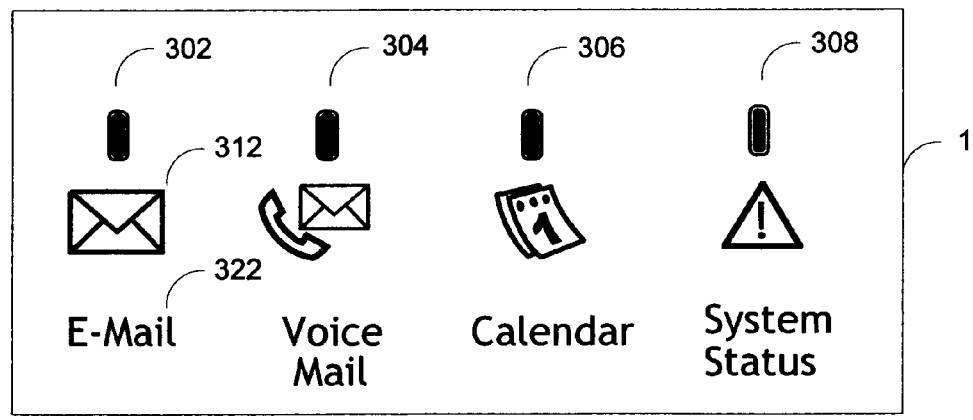
FIG. 3 is an exemplary illustration generally representing the use of a set of notification indicators as an auxiliary display in accordance with an aspect of the present invention.

FIG. 3 is an exemplary illustration generally representing the use of a set of notification indicators as an auxiliary display. There is one notification light, such as an LED, associated with each labeled category of information configured for alerting a user of notifications sent by an application or system component. The four categories of information illustrated in FIG. 3 are E-mail, Voice Mail, Calendar and System Status. Each LED associated with a category of information may be designated with a label. For example, LED 302 is associated with email notifications and is designated with the descriptive label of E-Mail 322. In addition to or instead of a descriptive label like E-Mail, an LED may be designated with an icon such as the envelope icon 312 appearing beneath LED 302 to indicate that LED 302 is associated with email notifications. Furthermore, each LED is capable of flashing and displaying different colors such as red, green, amber and blue for conveying additional information about the notification.

Figure 4:
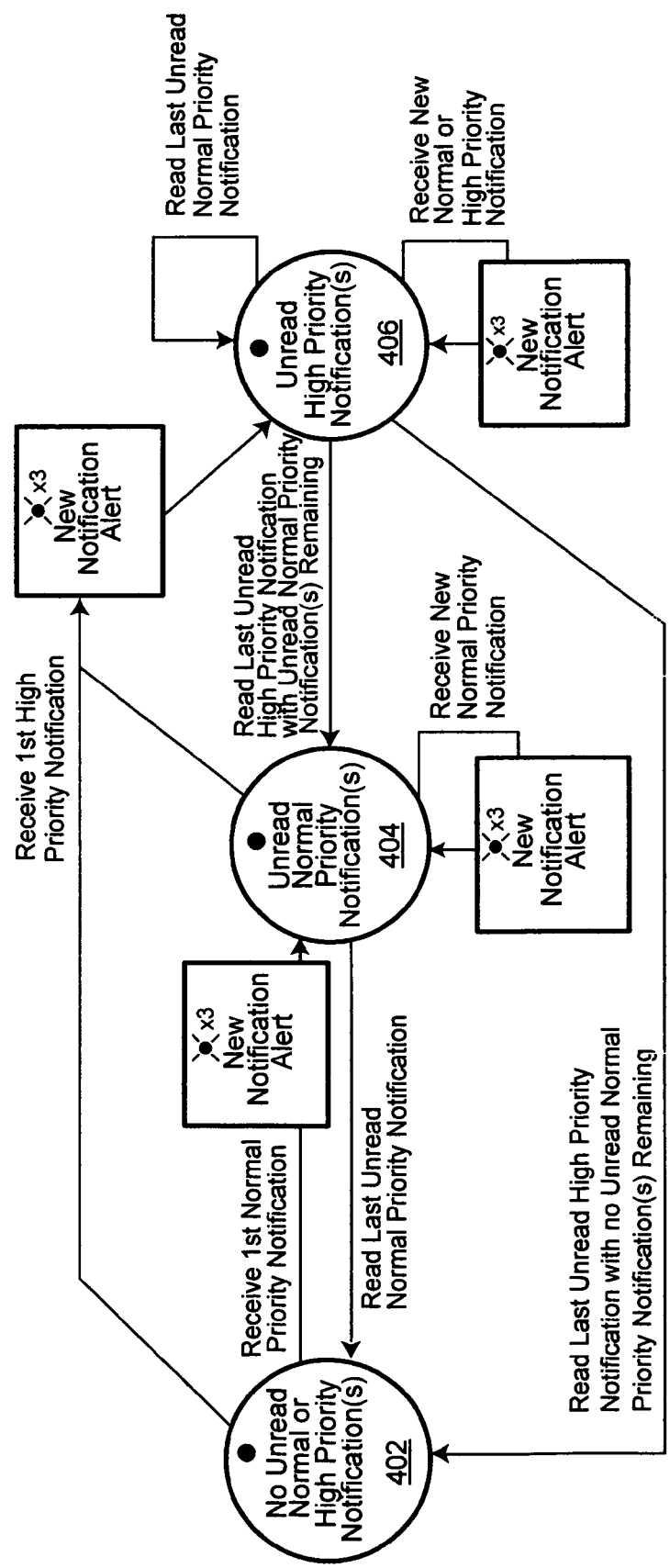
FIG. 4 is a state diagram generally illustrating the states of operation for the use of a set of notification indicators as an auxiliary display in accordance with an aspect of the present invention.

FIG. 4 presents a state diagram generally illustrating the states of operation for the use of a set of notification indicators as an auxiliary display. More particularly, the state diagram illustrates three states of operation applicable to each category of information of the auxiliary display 1 in the exemplary illustration of FIG. 3 and the actions associated with the transition between the states. Additionally, the behavior of the notification indicator is also illustrated for each state when notifications are received and when notifications are read. FIG. 4 will be described using email notifications as an example. As will be understood, the colors and described flash operations are examples, as many alternatives are feasible.

Before the first email notification is received, the system is in state 402 without any notifications to read. When a first email notification assigned a normal priority is received, the email notification indicator flashes blue three times and the system transitions to state 404 where the notification indicator remains illuminated as a steady blue light. If a high priority email notification is next received, then the email notification indicator flashes red three times (for example) and the system transitions to state 406 where the notification indicator remains illuminated as a steady red light. If the normal priority email notification was read, the system remains in state 406 until the last high priority email notification is read. If a new normal or high priority email notification is received while the system is in state 406, then the email notification indicator flashes red three times and the system remains in state 406 with the notification indicator illuminated as a steady red light. After the last high priority email is read, the system transitions to state 402, unless there are unread email notifications. If there are unread normal priority notifications, then the system transitions to state 404 and the notification indicator changes to a steady blue light. Once the last normal priority email notification is read, the system transitions to state 402 where the email notification indicator becomes unilluminated.

Each email notification may be read by bringing the email application program to the foreground on the monitor of the computer system and reading the email message that generated the notification. If the email application is not executing on the computer system, then the email application is first launched. In one exemplary embodiment of the present invention, there is a button associated with the notification indicator which may be pressed to launch or bring the application program or system component to the foreground. In another exemplary embodiment, a key associated with the application program or system component on the keyboard 40 of the computer system 20 may alternatively be pressed.

Although FIG. 4 was described using email, it should be understood that other categories of information may be used by the present invention that may change the behavior of the notification indicators differently. For example, voice mail may have its own indicator that uses the same state diagram of FIG. 4, or a similar state diagram. As another example, the system status notification indicator 308 is associated with system status information. Rather than have the system status notification indicator unilluminated while in state 402 when there are no system-related notification messages, the notification indicator may be illuminated as a steady green light to signify that the system is healthy. Although the notification indicators were described using a set of notification lights, those skilled in the art will appreciate that other types of notification indicators may be used. For instance, an audio indication may be generated to alert the user whenever a new notification is received, instead of or in addition to flashing the notification indicator three times.

Figure 5:
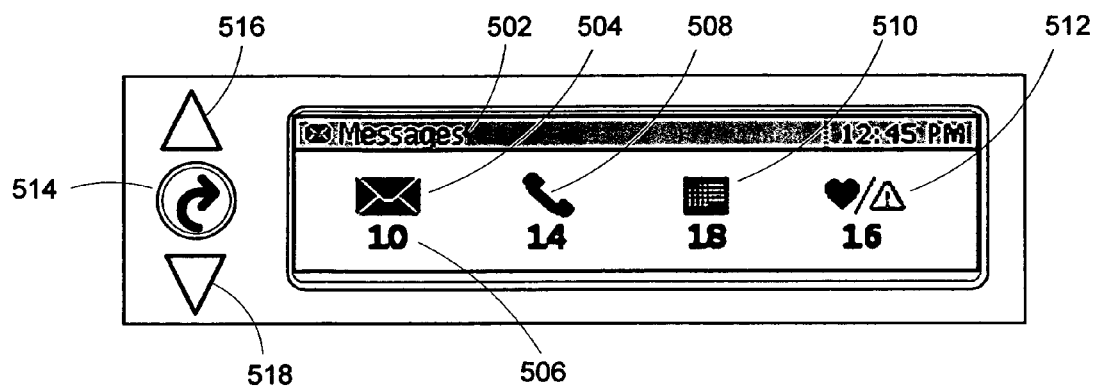
FIG. 5 is an exemplary illustration generally representing the use of a multi-line display as an auxiliary display in accordance with an aspect of the present invention.

FIG. 5 presents an exemplary illustration generally representing the use of a multi-line display as an alternate embodiment of an auxiliary display. The multi-line display used as the auxiliary display may be a monochrome or color display. The auxiliary display may have a header area 502 for indicating the general information presented on the display. Additionally, the current time is displayed in header area 502. Other information may be included in the header area 502 such as the weather, a stock ticker, time of day (or possibly of the last message received), and so forth. The information display area includes icons, such as the envelope icon 504 for email messages, for each category of information configured to alert a user of notifications or messages sent by an application or system component or the like. Beneath each icon is a tally of the total number of notifications received for that information category. Tally 506 displayed underneath the email icon 504 indicates that ten email messages have been received. The other icons illustrated in FIG. 5 that represent additional information categories are phone call notifications 508, calendar notifications 510 and system status notifications 512.

In one exemplary embodiment where the auxiliary display is of the form of a 2-line alphanumeric display, only a single row of icons for each information category with a second row indicating a tally beneath each icon may be displayed. Those skilled in the art will appreciate that there are other ways to present the information on a 2-line display and will also appreciate that additional information with more detail may be displayed on multi-line displays.

In another exemplary embodiment, the auxiliary display may have an input device associated with it. The input device may be a single button, like switch button 514 in FIG. 5, that allows the user to switch between different categories of information such as email messages 504, phone call notifications 508, calendar notifications 510, and system status notifications 512. Accompanying the switch button may be additional buttons for controlling the output of the auxiliary display. FIG. 5 illustrates an up button 516 and a down button 518. The down button 518 may be used to scroll downward or from right to left. The up button 516 may be used to scroll upward or from left to right. For example, a user may scroll across the information categories displayed in FIG. 5 by using the up button 516 or the down button 518 to select an information category such as system status notifications 512. Once selected, a user can press switch button 514 to move the application associated with that information category to the foreground on the monitor of the computer to read (or listen to or otherwise receive) the message or messages. If the application is not running on the computer in the background, then pressing the switch button 514 launches that application.

If the particular embodiment of the auxiliary display only has the single switch button 514, then the auxiliary display may automatically scroll through the information categories from left to right (or from right to left), pausing periodically on a particular information category. The user may then press the switch button 514 to move the application program to the foreground on the monitor of the computer to read (or listen to or otherwise receive) the message or messages.

In yet another exemplary embodiment, pressing switch button 514 after an information category has been selected results in displaying more detail about the messages received for that information category on the auxiliary display. For example, a user may scroll across the information categories displayed in FIG. 5 by using up button 516 to select an information category such as email messages 504. Once selected, a user can press switch button 514 to display a list of email messages received.

Figure 6:
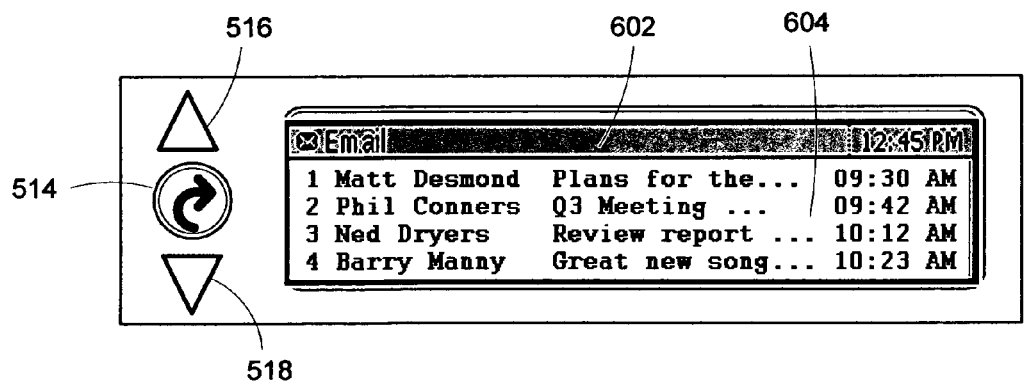
FIG. 6 is an exemplary illustration generally representing the use of the auxiliary display to show a list of detailed information in accordance with an aspect of the present invention.

FIG. 6 presents an exemplary illustration generally representing the use of the auxiliary display to show a list of detailed information. More particularly, FIG. 6 illustrates the use of the auxiliary display to present more detail about the messages received in an information category, and specifically shows additional details about the email messages received. After a user has selected email messages 504 and pressed the switch button 514, the header area 502 is changed to indicate that the display information is about email as illustrated in the header area 602 of FIG. 6. The information display area 604 also is updated to present more detail about the email messages received and lists the first four emails received along with the name of the sender, the first few words of the subject and the time the email was sent.

By pressing the down button 518, the user may view additional email messages. The user may use either the down button 518 or the up button 516 to scroll through the email messages and to select a particular message. Once selected, a user can press switch button 514 to move the application associated with that information category to the foreground on the monitor of the computer to read the message(s). If the application is not running on the computer in the background, then pressing the switch button 514 launches that application.

If the particular embodiment of the auxiliary display only has the single switch button 514, then the auxiliary display may automatically scroll through the email messages in display area 604 from top to bottom, pausing periodically on a particular email message. The user may then press the switch button 514 to move the application program to the foreground on the monitor of the computer to read the message.

The auxiliary display illustrated in FIGS. 5-6 may additionally have a set of notification indicators as described in FIG. 3. There may also be a button associated with each notification indicator that may be pressed to launch or bring the application program or system component to the foreground. As previously discussed, in another exemplary embodiment, a key associated with the application program or system component on the keyboard 40 of the computer system 20 may alternatively be pressed.

Figure 7:
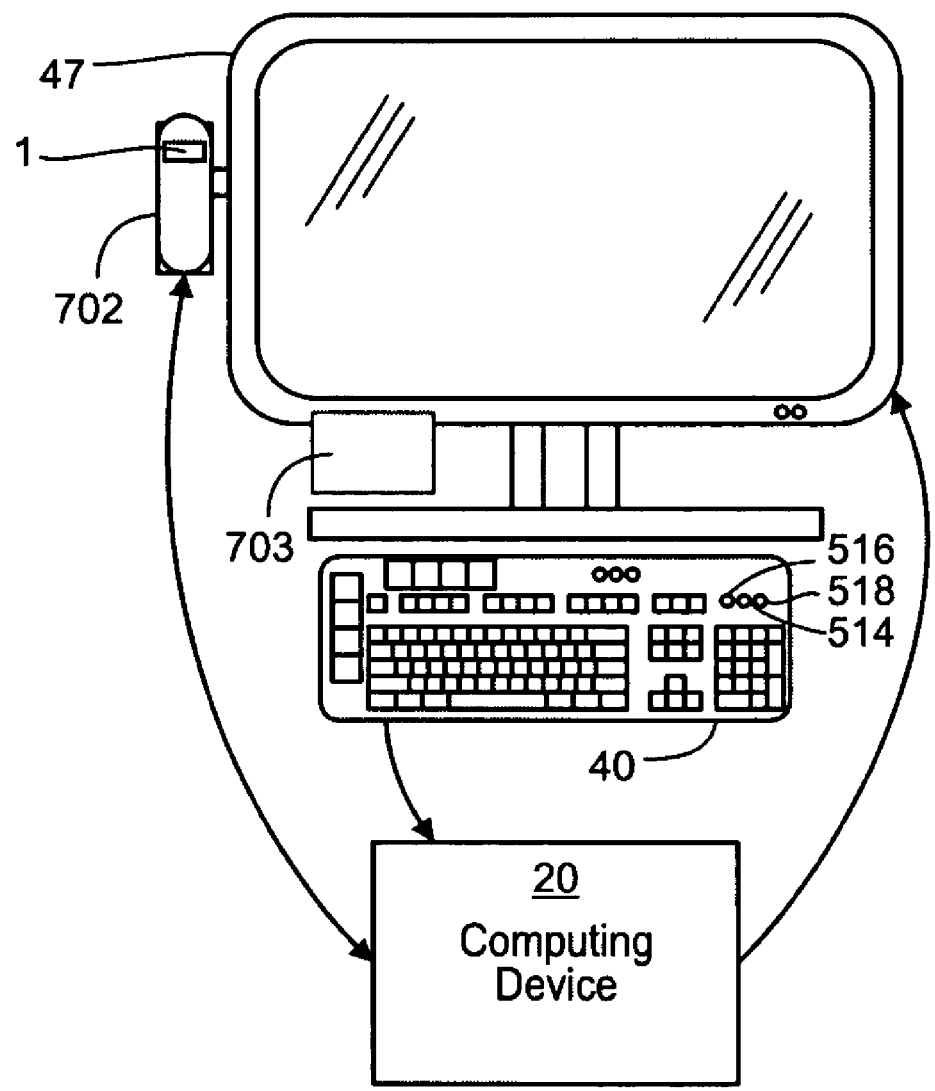
FIG. 7 is an exemplary illustration generally representing the use of another computing device's display as an auxiliary display in accordance with an aspect of the present invention.

FIG. 7 illustrates yet another exemplary embodiment of the auxiliary display 1 by using the display of another computing or communication device. FIG. 7 shows a phone 702 attached to the monitor 47 of FIG. 2 and connected to computing device 20 of FIG. 2 by a connection such as a serial interface, infrared or wireless interface, USB or other peripheral device connection. Monitor 47 and keyboard 40 are also connected to computing device 20 as depicted in FIG. 2 and previously described. The phone 702 may also be a cellular telephone or other mobile computing device capable of connecting with computing device 20 by wired cradle or using Bluetooth™ technology or other wireless technology including ultra-wide band technology. Note that many mobile telephones have display screens and perform computing functions that appear more like a personal computer than a mobile telephone. In any event, the phone 702 has its own display 1 which may be used to alert a user of notifications and information when it is not otherwise displaying information for its primary functions.

Like the previously described embodiments of the auxiliary display, display messages are sent to the phone 702 to display. In one exemplary embodiment, keyboard 40 includes the switch button 514, the up button 516, and the down button 518 for controlling the output of the display when operating as the auxiliary display 1. Alternatively or in addition to, key combinations and/or function keys may be configured to control the auxiliary display. Alternatively, it will be appreciated by those skilled in the art that the buttons on the phone 702 may be used to control the output of the display when operating as the auxiliary display 1.

Although the display of a phone was described for use as the auxiliary display, those skilled in the art will readily appreciate that the displays of other computing or communication devices may be similarly used as the auxiliary display, including general purpose computers and handheld devices such as a pager or a personal digital assistant (PDA).

Figure 8:
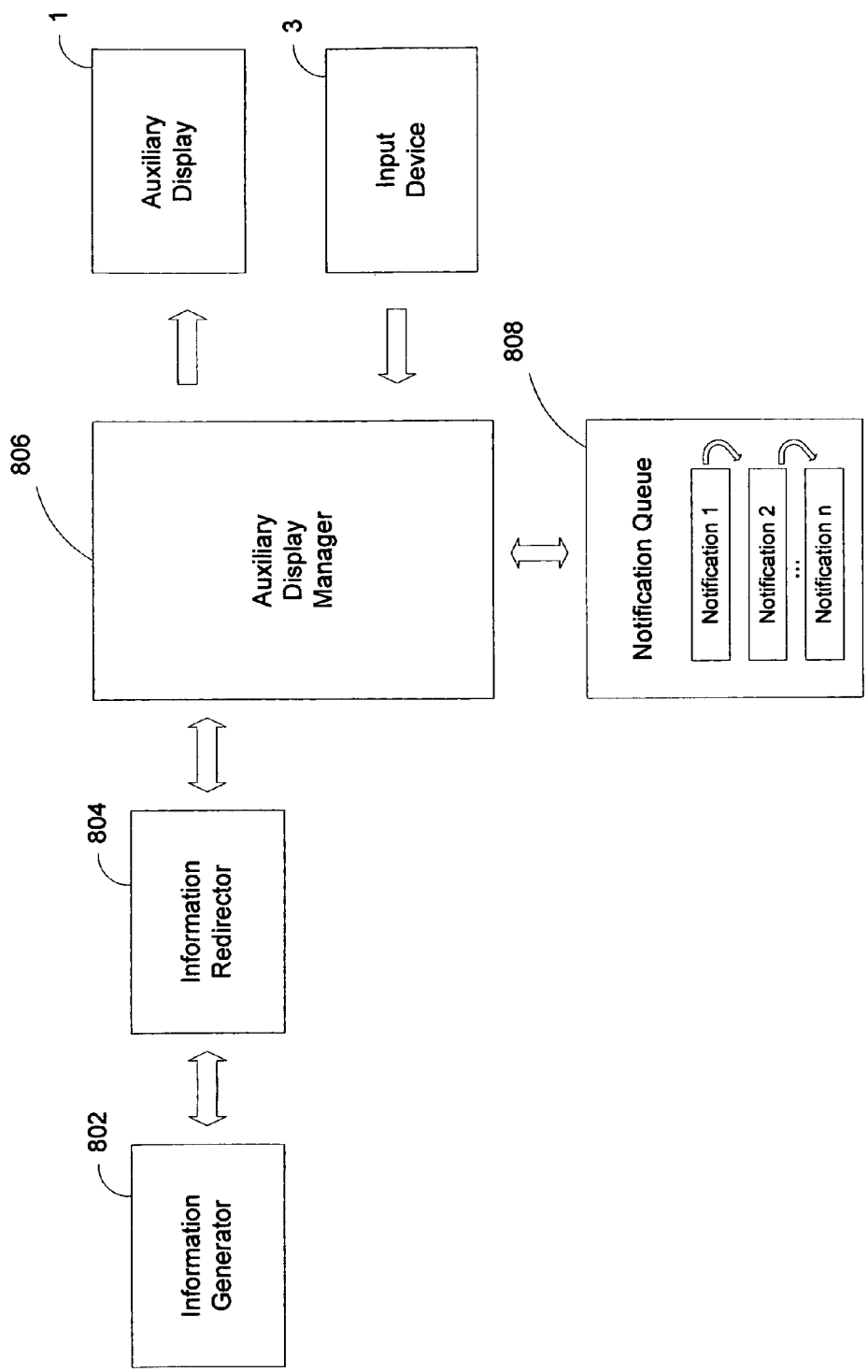
FIG. 8 is a block diagram generally representing the components of an exemplary embodiment of an auxiliary display facility used for the auxiliary display of information in accordance with an aspect of the present invention.

FIG. 8 is a block diagram generally representing the components of an exemplary embodiment of an auxiliary display facility used for the auxiliary display of information. Those skilled in the art will appreciate that the functionality implemented within the blocks illustrated in the diagram may be implemented as separate components or the functionality of several or all of the blocks may be implemented within a single component. For example, a separate library may be implemented that contains the functionality of the information redirector and the functionality of the auxiliary display manager. In such an implementation, executables linked to the library may send notifications directly to the auxiliary display when they are executing on the computer system.

Any application program or operating system component may serve as an information generator 802 that sends information for auxiliary display. For example, communication applications such as email, voicemail, telephony and instant messaging may send a notification whenever there is a new incoming communication. Information services like internet-related services or network-based communication services may send notifications of information for which the user subscribed. Personal management applications including calendar and task management programs, herein referred to as calendar or calendar program, send reminders of upcoming meetings and due dates for tasks. Operating system components provide notifications of device status, service alerts, and system health. Any information or notifications sent by these programs or components for display on the main monitor of a computer system are intercepted by the information redirector 804.

For each information message intercepted, the information redirector 804 compares the source of the message and the message type against a database of messages that are to be redirected for display on the auxiliary display. Whenever there is a match in the database, the information redirector send that message to the auxiliary display manager 806 rather than forwarding it on for display on the main monitor. Other mechanisms are feasible, e.g., instead of a database, an application or operating system component can flag a message with a request to send that message to the auxiliary display (or to the main display instead of the auxiliary display).

The auxiliary display manager 806 receives new notifications from the information redirector 804, manages a notification queue 808 comprising notifications to send, sends display messages to the auxiliary display 1, and receives input requests from the input device 3 for reviewing notifications.

The auxiliary display manager 806 also contains the configuration routines for updating the database of message sources and types that are to be displayed on the auxiliary display 1. Those skilled in the art will appreciate that notification queue 808 is an exemplary data structure used by the auxiliary display manager and that other data structures or databases may be used by the auxiliary display manager 806 to manage messages received from the information redirector 904.

Figure 9:
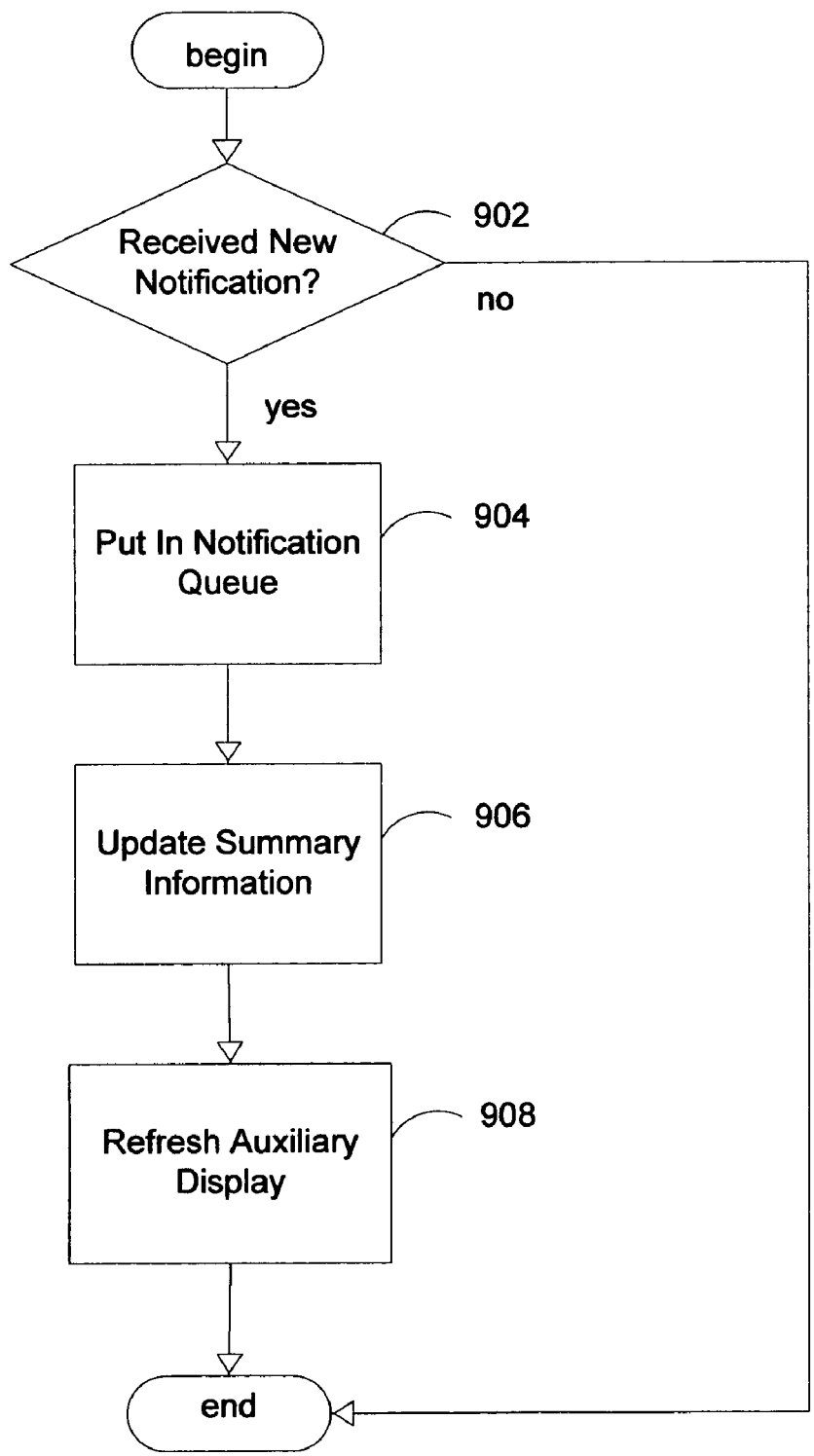
FIG. 9 is a flowchart generally representing the steps undertaken for auxiliary display of a new notification in accordance with an aspect of the present invention.

FIG. 9 is a flowchart generally representing example steps undertaken by the auxiliary display manager 806 (FIG. 8) for auxiliary display of a new notification. First, the auxiliary display manager checks if it has received a new notification message at step 902. If it has not, then it is finished processing. However, if it received a new notification message, then it puts the new notification message in the notification queue 808 at step 904. Note that the steps of FIG. 9 are only examples, as, for example, the auxiliary display manager 806 (FIG. 8) may be event driven, and thus step 902 may represent an event that triggers the auxiliary display manager 806.

To put the new notification in the notification queue 808 (FIG. 8) at step 904 (FIG. 9), the auxiliary display manager checks the message type and message priority to determine the priority of the message. For a high priority message, the auxiliary display manager may insert the message at the head of the queue. For a normal priority message, the auxiliary display manager inserts the message after the highest priority message that has not yet been displayed in the queue. Although there are other ways to insert messages in the queue as is appreciate by those skilled in the art, this method places the highest priority messages to be displayed at the head of the queue. Alternatively, there may be a high-priority queue and a normal priority queue. Also, there may be other priority levels and/or queues.

Once the new notification has been put in the notification queue 808, the auxiliary display manager updates the summary information at step 906. To update the summary information, the auxiliary display manager increments the tally for the information category of the new notification received. After the summary information has been updated, the auxiliary display manager refreshes the auxiliary display at step 908.

Figure 10:
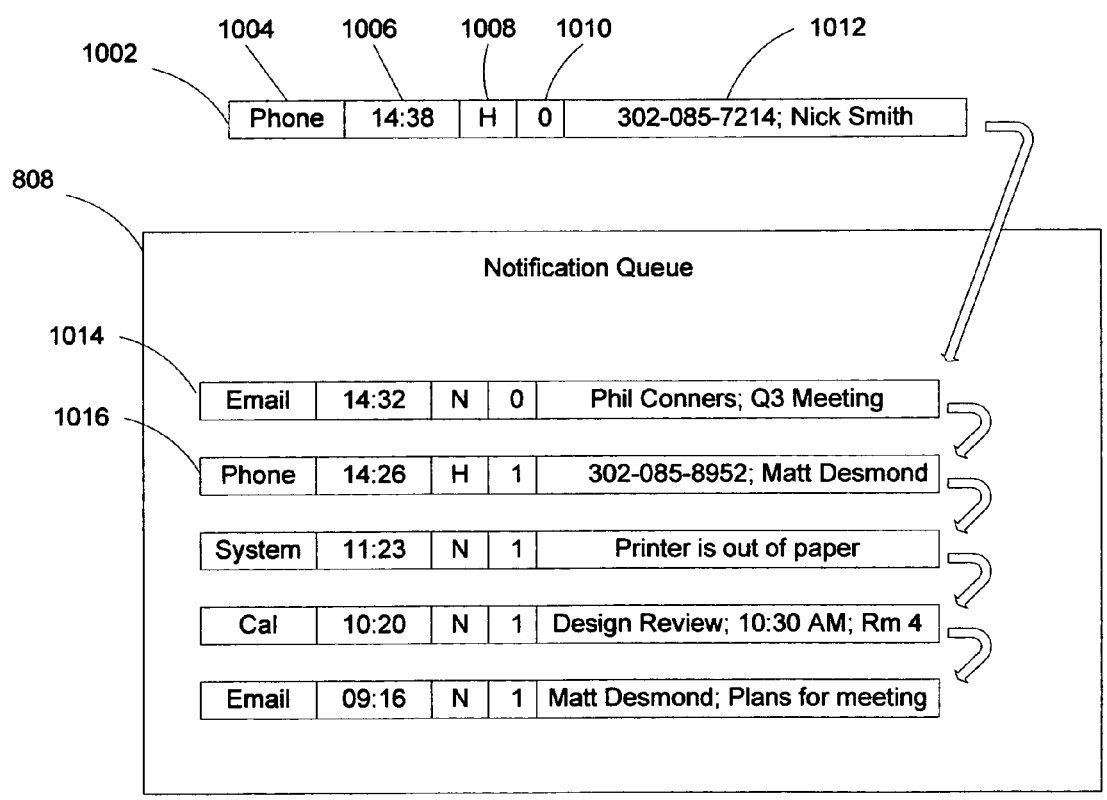
FIG. 10 is an exemplary illustration generally representing the addition of a new information message to the notification queue in accordance with an aspect of the present invention.

FIG. 10 is an exemplary illustration generally representing the addition of a new information message to the notification queue as was described in step 904 of FIG. 9. When the auxiliary display manager receives a new message, the auxiliary display manager checks the message type and message priority to determine where to insert the new message in the notification queue. For example, a new phone call message 1002 received by the auxiliary display manager is illustrated in FIG. 10. It has a message type field 1004, a time received field 1006, a message priority field 1008, a displayed flag for indicating whether the message was displayed (set to one if displayed and set to zero if undisplayed) 1010, and a message content field 1012, which may comprise the message itself or a pointer to a message file. Message types for synchronous communications such as incoming phone call notifications may have priority for display over message types for asynchronous communications such as system status messages.

After checking the message type, the auxiliary display manager checks the priority field of the message. High priority messages have priority over normal priority messages. A synchronous communication message type with a high priority is inserted after the last undisplayed message of similar message type and message priority from the top of the notification queue. A synchronous communication message type with a normal priority is inserted after the last undisplayed message of similar message type and message priority from the top of the notification queue. An asynchronous communication message type with a high priority is inserted after the last undisplayed message of similar message type and message priority from the top of the notification queue. Finally, an asynchronous communication message type with a normal priority is inserted after the last undisplayed message of similar message type and message priority from the top of the notification queue.

The new phone call message 1002 received by the auxiliary display manager is a synchronous communication message as indicated by the message type of "phone" in the message type field 1004 and has a high priority as indicated in the message priority field 1008 by the character "H". It is inserted at the head of the queue because there are no other synchronous phone messages with high priority that are undisplayed in the notification queue. Note that message 1016 is also an incoming phone call message with a high priority, but it has already been displayed as indicated by the displayed flag field. Also note that the new incoming phone call message 1002 is placed before email message 1014 which is an asynchronous communications message that has not yet been displayed.

Figure 11:
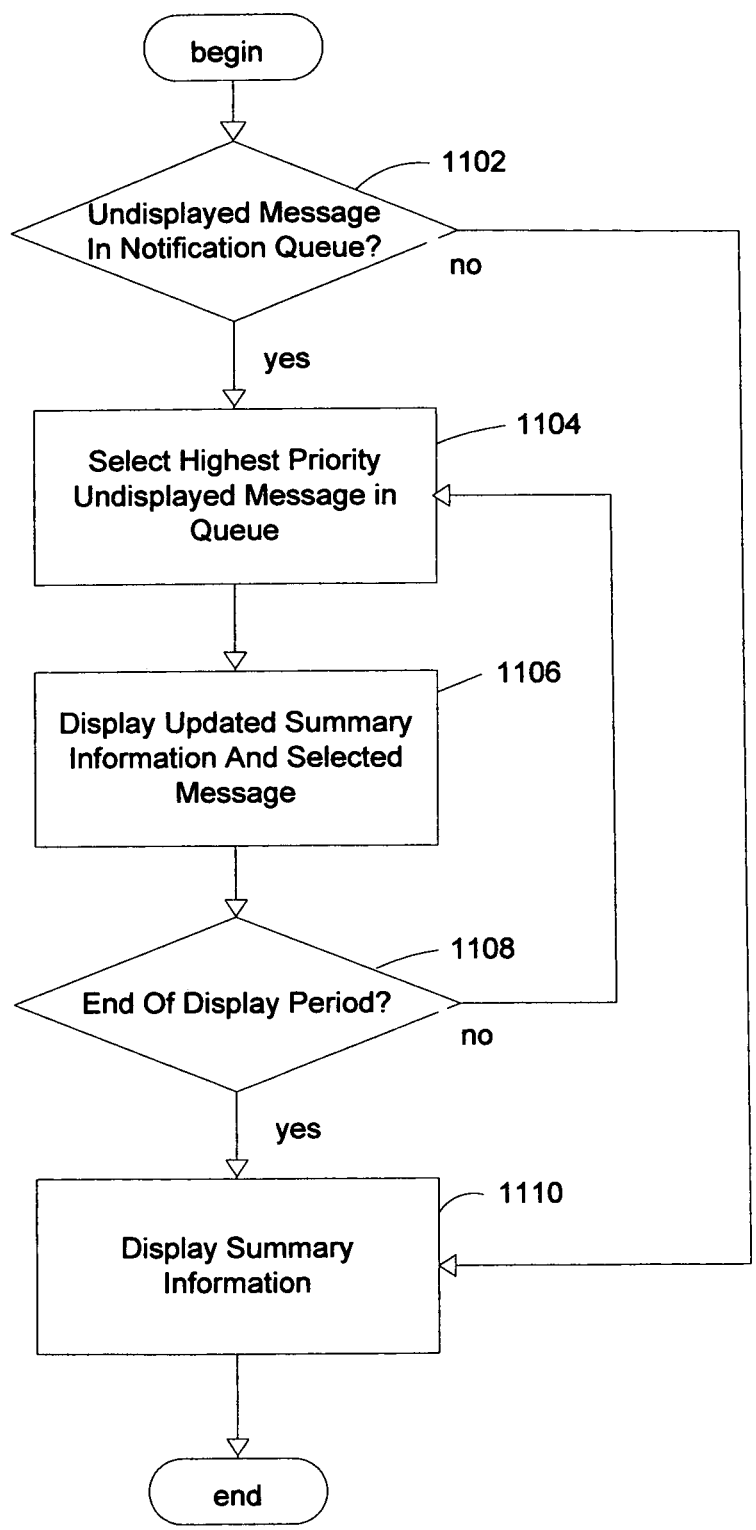
FIG. 11 is a flowchart generally representing the steps for refreshing the auxiliary display in accordance with an aspect of the present invention.

FIG. 11 is a flowchart generally representing the steps undertaken by the auxiliary display manager for refreshing the auxiliary display at step 908 of FIG. 9. First the auxiliary display manager checks if there are any undisplayed messages in the notification queue at step 1102. If there are not, then it proceeds to step 1110. However, if there are any undisplayed messages in the notification queue, then it selects the highest priority message that is undisplayed in the notification queue 808 at step 1104.

To select the highest priority message that is undisplayed in the notification queue 808 at step 1104, the auxiliary display manager scans the notification queue beginning at the head of the queue until it finds the first undisplayed message. Note that the highest priority message for display will be the first undisplayed message from the head of the queue as described previously at step 904 of FIG. 9. Those skilled in the art will appreciate that there are other ways to order the messages in the queue and select the highest priority message for displaying on the auxiliary display.

Once the highest priority message has been selected at step 1104, the auxiliary display manager then displays at step 1106 the selected message and the summary information that was updated at step 906 of FIG. 9. Each message type has a display period assigned for how long that message type is to be displayed. If a higher priority message is received before the currently displayed message has been displayed for the entire display period assigned, the higher priority message preempts the display of the current message. Prior to sending the selected message to the auxiliary display in one embodiment, the auxiliary display manager checks to see if this selected message is a different message than the previous message selected to be sent to the auxiliary display. If this is a different message, then the display period is set for the duration assigned to that message type. If the selected message was the same message previously selected to be sent, then the display period is not reset. It will appreciate that there are other ways to implement how a selected message is displayed for the entire display period after being preempted by a higher priority message.

The auxiliary display manager displays the selected message and the updated summary information by sending them to the auxiliary display. If the auxiliary display also has notification indicators such as a set of notification lights, then the auxiliary display manager also sends a message to the auxiliary display to set the message indicators as described in FIG. 4, such as flashing the appropriate notification light some appropriate number of times before remaining illuminated as a steady light. Additionally, an audio indication may also be generated, as also described above. For multi-line displays, the auxiliary display manager may display additional information as also described above, such as the weather, a stock ticker, and so forth.

After sending the selected message and the updated summary information to the auxiliary display, the auxiliary display manager checks if the display period has expired at step 1108. If the display period has expired, then the auxiliary display manager displays the summary information at step 1110. If the display period has not expired, then the auxiliary display manager returns to step 1104 because a higher priority message may be received that preempts the display of the current message before its display period has expired.

At step 1110, the auxiliary display manager displays summary information when there are no more undisplayed messages in the notification queue. If the display period expired at step 1108 for the currently displayed message, then the auxiliary display manager sets the display flag of the message to the value of one which indicates that the message has been displayed for the entire display period. Then the auxiliary display manager sends the summary information to the auxiliary display for display.

Figure 12:
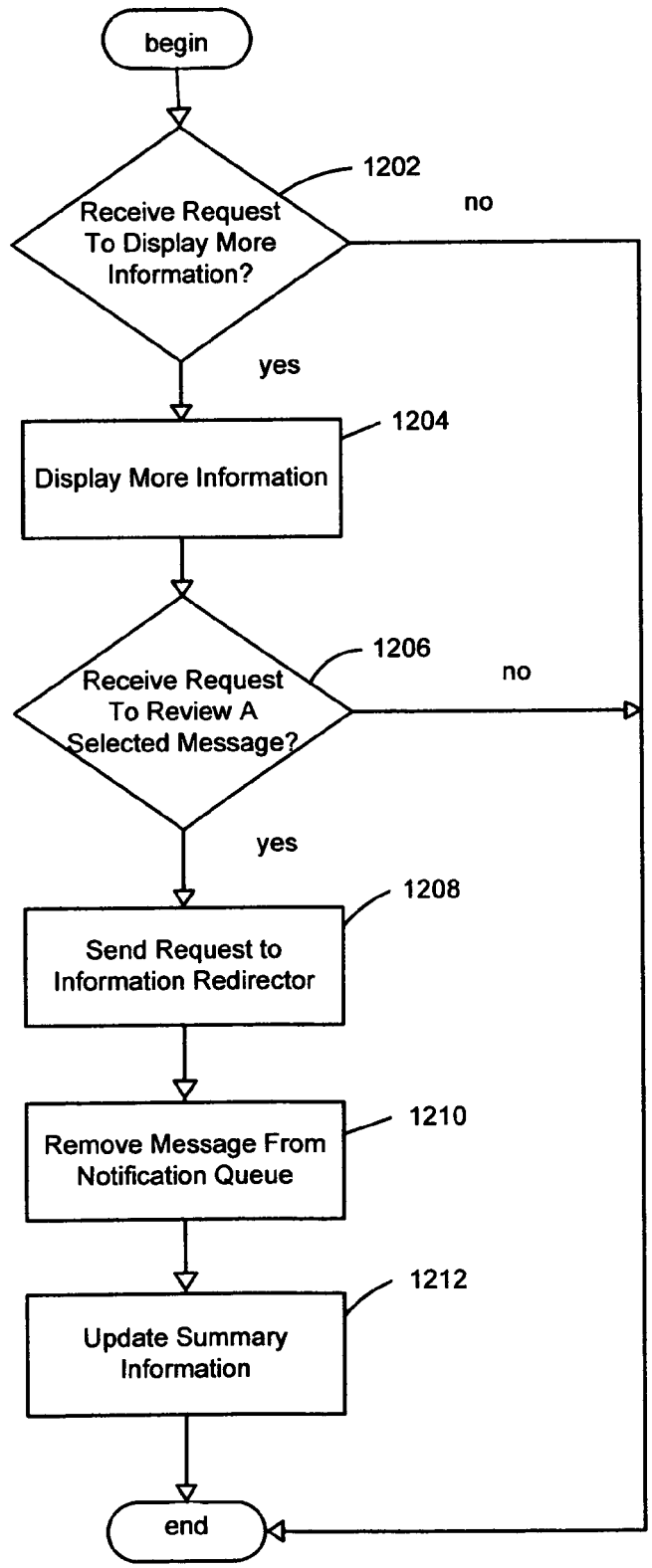
FIG. 12 is a flowchart generally representing the steps for providing more detailed information about displayed messages in accordance with an aspect of the present invention.

FIG. 12 is a flowchart generally representing the steps undertaken by the auxiliary display manager upon receiving a request to provide more detailed information about displayed messages. As previously discussed, a user may request to receive more detailed information about messages or to review a selected message by using an input device controlling the output of the auxiliary display. First the auxiliary display manager checks if it has received any request to display more detailed information such as a message list at step 1202. If not, then it finishes processing. However, if it has received a request to display more detailed information, then the auxiliary display manager displays more detailed information such as the message list at step 1204. As will be appreciated, the user may scroll forward and backward through the detailed information such as a message list to view additional messages using the input device controlling the output of the auxiliary display.

Next the auxiliary display manager checks if it has received a request to review a selected message at step 1206. If not, then the auxiliary display manager finishes processing. However, if it has received a request to review a selected message, then it sends a request to the information redirector 804 at step 1208. The information redirector brings the information generator 802 that originated the notification to the foreground of the monitor on the computer system and forwards the request to the information generator so that it may display the information or message that generated the notification on the main monitor. As discussed previously, if the information generator is not executing in the background on the computer system, then the information redirector launches the information generator to execute in the foreground on the monitor before forwarding the request to review a selected message.

At step 1210, the auxiliary display manager removes the message which was selected at step 1208 from the notification queue 808. Then, the auxiliary display manager updates the summary information by decrementing the tally for the information category of the selected message by one. After the summary information has been updated, the auxiliary display manager is finished.

Those skilled in the art will appreciate that messages which remain unread in the notification queue may be automatically removed after a specific time period in another exemplary embodiment. Furthermore, it will be appreciated the time period may be configurable for each message type.

Figure 13:
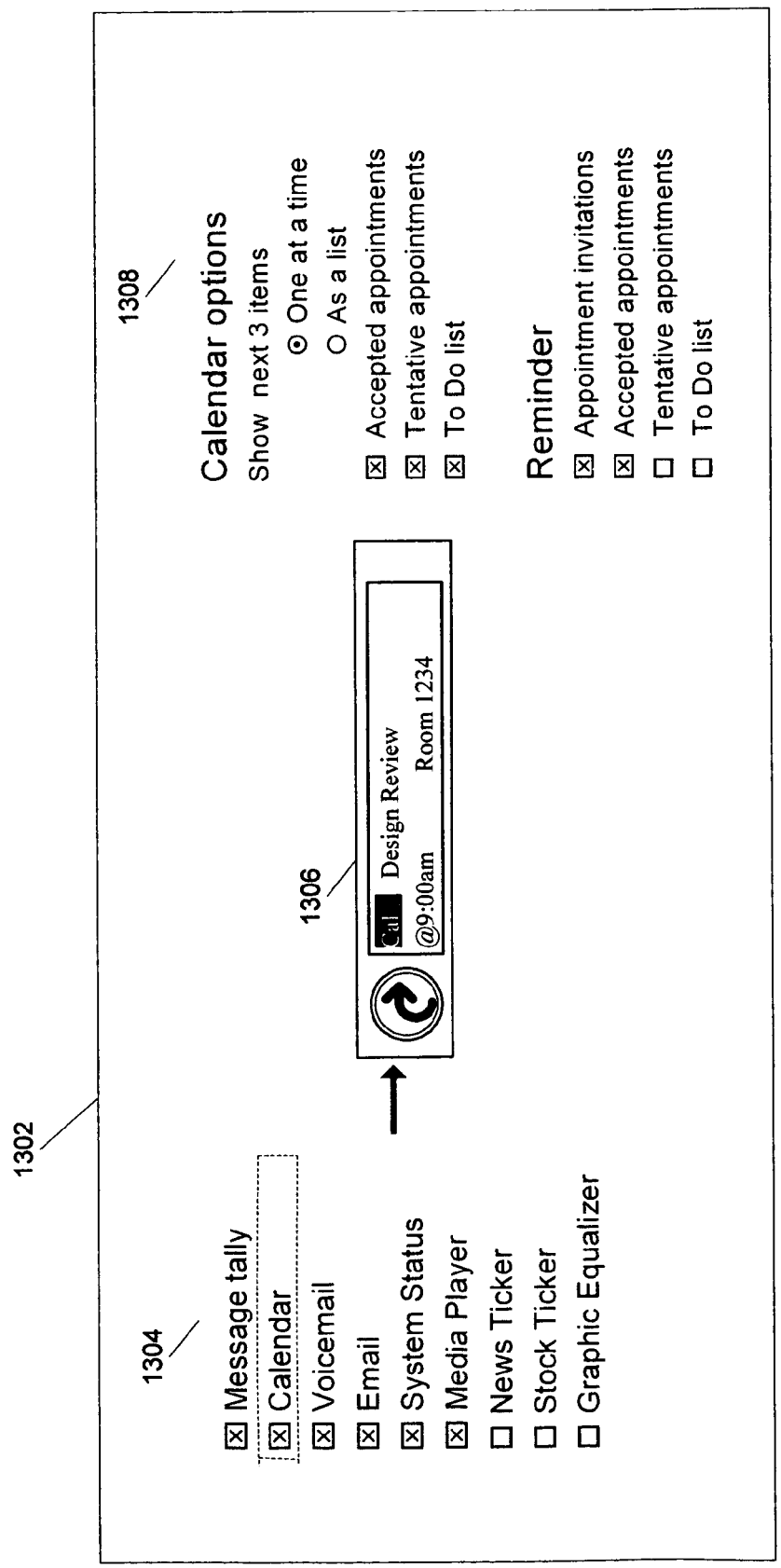
FIG. 13 is an exemplary illustration generally representing a user interface for configuring notifications for auxiliary display in accordance with an aspect of the present invention.

FIG. 13 is an exemplary illustration of a straightforward user interface screen used for configuring notifications for auxiliary display. User interface screen 1302 displays a list of information categories 1304, each with a checkbox which may be selected for redirecting their notifications from the main computer monitor to the auxiliary display. For example, the Message Tally, Calendar, Voicemail, Email, System Status and Media Player are selected in the list 1304. As a user selects an information category from the list 1304, the user interface displays a simulated auxiliary display 1306 within the user interface screen 1302 so that the user may see the type of notifications that will be displayed on the auxiliary display.

The user interface screen 1302 also displays a list of options 1308 available for each information category under selection. These options include specific content available within the information category. For example, the "Calendar" information category is highlighted for selection in list 1304. The list of options 1308 provided for the Calendar includes accepted appointments, tentative appointments and to-do list. Additionally, the user interface screen may include options to configure global settings in a header area such as showing the clock, as well as configuring settings in a footer area such as showing the previously displayed message. Further, other options for configuration may be included that apply for individual information categories such a display period, audible indicator, visual indicator, caller ID or sender of the message, and so forth.

Figure 14:
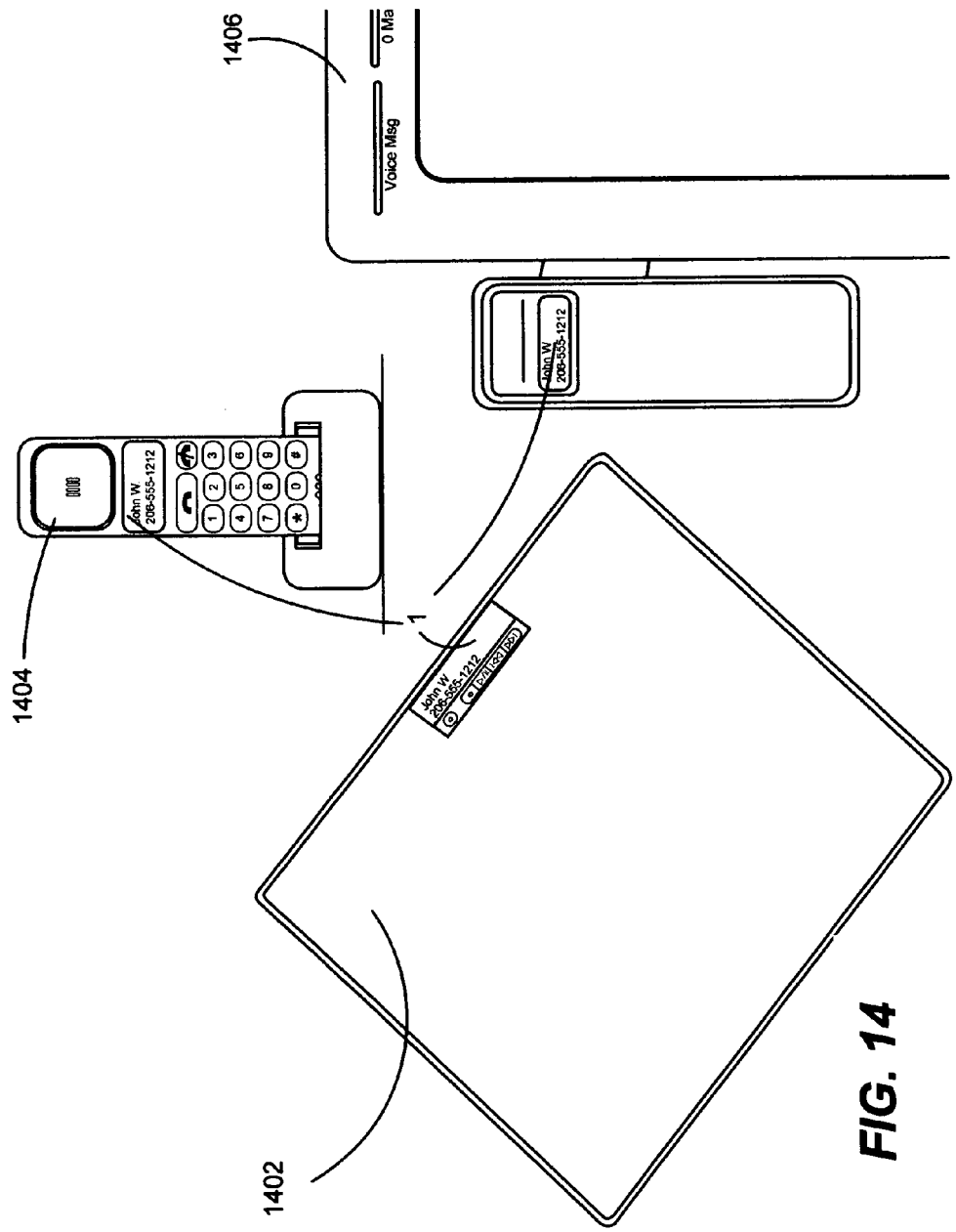
FIGS. 14-15 are exemplary illustrations generally representing locations for placement of the auxiliary display on various devices.
Figure 15:
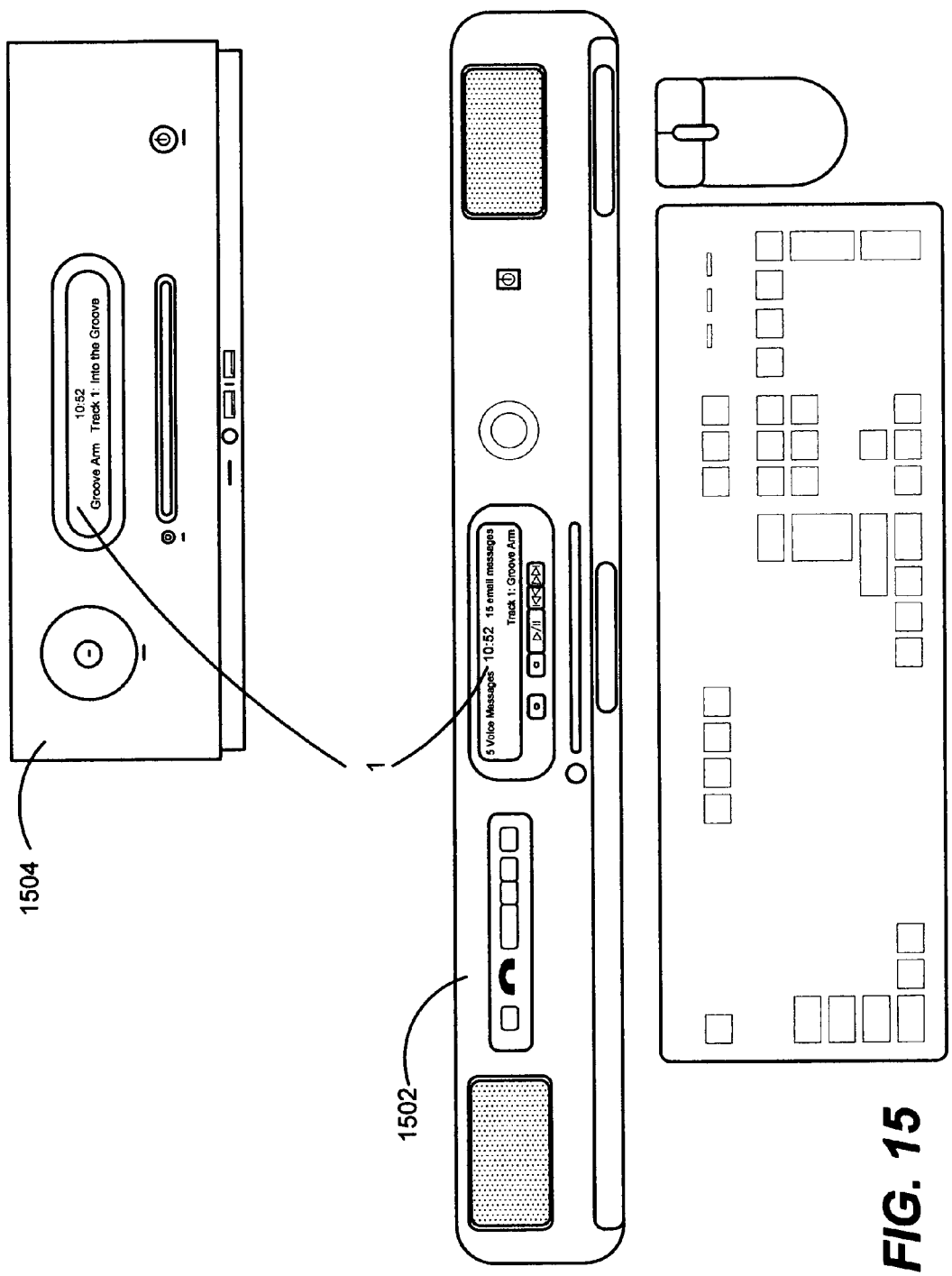

As previously discussed, the auxiliary display may be located in any variety of places, including placed on the central processor chassis or on the monitor border (e.g., the auxiliary display 703 of FIG. 7) so that display data that can be viewed from a distance. FIG. 14 illustrates exemplary locations on computing devices for placement of the auxiliary display. The auxiliary display 1 may be placed on the edge or lid of a mobile computer 1402 or tablet (not shown). It may also be placed on the front, back or other surface of a standalone phone 1404 or on a phone mounted on a computer or a peripheral device attached to a computer such as on monitor 1406 or on a keyboard (not shown). FIG. 15 illustrates additional placements of the auxiliary monitor on the front panel of a CPU module 1502 or standalone console 1504 connected to a computer. Those skilled in the art will appreciate that the auxiliary display may be placed on any surface of any computing device or device with display capabilities, such as placed on a watch with a wireless or other connection to a computer, a remote control, a remote wall-mounted unit, and so forth.

It should be noted that the computer system need not be fully operational for the auxiliary display to work in accordance with the present invention. Indeed, the auxiliary display may still work when the computer is powered down, at least to a default extent or to an extent configured by a user, such as when the computer system is in a sleep state or a hibernate mode, and/or when the user is locked out of the system via security mechanisms. For example, the user may want the telephone handset and speakerphone to work as conventional appliances when the computer system is powered down, and use the auxiliary display as a caller-ID device. This device may also store data for later transmission to the computer system when the computer system is again powered up, such as to log the calls received, including when the computer system was not fully powered up.

Also, the auxiliary display may serve as a secondary display when the main display is shut down or otherwise not operational (e.g., disconnected), to give the user some information. Information such as how to power up the main display would be helpful, as would a room number and/or directions to a meeting on an auxiliary display device connected to a laptop computer that the user can view when the lid is closed. Even on a tablet PC with a visible screen, the main display may be shut down to save power, whereby an auxiliary display would provide substantial benefits. Note that the user may limit the extent of the display based on the computer system state, e.g., when the user is not logged in, only certain non-sensitive or very specifically-controlled information may be displayed, and so forth.

To enable and control communications in these powered down modes, the auxiliary display may be loaded into executable non-volatile memory, operated with a secondary processor, and so forth, so that the display works as long as some power is available, even though the disk, main processor, main display, network card and/or other parts of the system are powered down.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A method for displaying notifications on an auxiliary display of a computing device that are specifically directed to a main display of the computing device, comprising:
   receiving a notification at an information redirector running on the computing device, the notification being received from a background task of an information generator that is also running on the computing device, the information generator being either a personal management application comprising a calendar and task management program, or an operating system; and wherein the notification comprises:
      a notification of a scheduled item in a calendar or of a due date of a task when the information generator is the personal management application, or
      a notification of device status, service alerts, or system health when the information generator is the operating system;
   redirecting the notification to an auxiliary display manager of an auxiliary display rather than forwarding the notification to the main display such that the notification is not displayed on the main display;
   receiving the notification at the auxiliary display manager of the auxiliary display;
   the auxiliary display manager displaying the notification on the auxiliary display;
   upon receiving user input that selects the notification, the auxiliary display manager notifying the information redirector of the selection of the notification;
   the information redirector bringing the information generator that generated the notification to the foreground of the computing system and notifying the information generator of the selection of the notification; and
   the information generator displaying the information corresponding to the selected notification on the main display of the computing system.

2. The method of claim 1 wherein upon receiving the notification, the auxiliary display manager stores the notification in an auxiliary display queue and updates summary information that provides an indication of the number of notifications that are stored in the auxiliary display queue, the method further comprising:
   the auxiliary display manager removing the selected notification from the auxiliary display queue and updating the summary information such that the selected notification is no longer displayed on the auxiliary display; and
   displaying the summary information on the auxiliary display after the user selects the notification.

3. The method of claim 1, wherein the notification corresponds to one of an email, instant message, calendar event, or system status of the computing device and wherein displaying the information corresponding to the selected notification on the main display comprises displaying the email using an email application, displaying the instant message using an instant message application, displaying the calendar event using a calendar application, or displaying the system status using an operating system component of the computing device.

4. The method of claim 2, wherein the notification is displayed on the auxiliary display upon being stored in the auxiliary display queue.

5. The method of claim 4, wherein the notification is displayed for a predefined period of time after which the summary information is displayed on the display device in place of the notification.

6. The method of claim 5, further comprising:
   receiving user input while the summary information is being displayed, and in response, displaying a list of the notifications that are stored in the auxiliary display queue.

7. The method of claim 6, wherein the selected notification is a first notification and further comprising:
   receiving user input that selects a second notification from the list of the notifications, and in response, the auxiliary display manager notifying the information redirector of the selection of the second notification;
   the information redirector bringing the information generator that generated the second notification to the foreground of the computing system and notifying the information generator of the selection of the second notification; and
   the information generator displaying the information corresponding to the second notification on the main display of the computing system.

8. The method of claim 7, wherein the information generator that generated the second notification is different than the information generator that generated the first notification.

9. The method of claim 2, further comprising:
   removing the notification from the auxiliary display queue after a predefined period of time even if the notification has not been selected by the user.

10. The method of claim 1 wherein the notification is a first notification and wherein each notification includes a priority, the method further comprising:
    receiving a second notification from the information redirector while the first notification is being displayed on the auxiliary display;
    determining that the second notification has a higher priority than the first notification; and
    displaying the second notification in place of the first notification.

11. The method of claim 10, further comprising:
    storing an indication with the first notification that indicates that the first notification was not displayed for a first predefined period of time such that after the second notification is displayed for a second predefined period of time, the first notification is displayed again on the auxiliary display without user input.

12. A computer storage medium having stored computer executable instructions which when executed by a processor perform a method for displaying notifications on an auxiliary display of a computing device that are specifically directed to a main display of the computing device, comprising:

receiving a notification at an information redirector running on the computing device, the notification being received from a background task of an information generator that is also running on the computing device, the information generator being either a personal management application comprising a calendar and task management program, or an operating system, and wherein the notification comprises:
- a notification of a scheduled item in a calendar or of a due date of a task when the information generator is the personal management application, or
- a notification of device status, service alerts, or system health when the information generator is the operating system;

redirecting the notification to an auxiliary display manager of an auxiliary display rather than forwarding the notification to the main display such that the notification is not displayed on the main display;

receiving the notification at the auxiliary display manager of the auxiliary display;

the auxiliary display manager displaying the notification on the auxiliary display;

upon receiving user input that selects the notification, the auxiliary display manager notifying the information redirector of the selection of the notification;

the information redirector bringing the information generator that generated the notification to the foreground of the computing system and notifying the information generator of the selection of the notification; and the information generator displaying the information corresponding to the selected notification on the main display of the computing system.

13. The computer storage medium of claim 12, wherein upon receiving the notification, the auxiliary display manager stores the notification in an auxiliary display queue and updates summary information that provides an indication of the number of notifications that are stored in the auxiliary display queue, and wherein the notification is displayed for a predefined period of time after which the summary information is displayed on the display device in place of the notification.

14. The computer storage medium of claim 13, further comprising:

receiving user input while the summary information is being displayed, and in response, displaying a list of the notifications that are stored in the auxiliary display queue.

15. The computer storage medium of claim 14, wherein the selected notification is a first notification and further comprising:

receiving user input that selects a second notification from the list of the notifications, and in response, the auxiliary display manager notifying the information redirector of the selection of the second notification;

the information redirector bringing the information generator that generated the second notification to the foreground of the computing system and notifying the information generator of the selection of the second notification; and the information generator displaying the information corresponding to the second notification on the main display of the computing system.

16. The computer storage medium of claim 15, wherein the information generator that generated the second notification is different than the information generator that generated the first notification.

17. The computer storage medium of claim 12, wherein the notification is a first notification and wherein each notification includes a priority, further comprising:

receiving a second notification from the information redirector while the first notification is being displayed on the auxiliary display;

determining that the second notification has a higher priority than the first notification; and displaying the second notification in place of the first notification.

18. The computer storage medium of claim 17, further comprising:

storing an indication with the first notification that indicates that the first notification was not displayed for a first predefined period of time such that after the second notification is displayed for a second predefined period of time, the first notification is displayed again on the auxiliary display without user input.

19. The computer storage medium of claim 17 wherein the first and second notifications are stored in an auxiliary display queue, and wherein each notification includes a type comprising one of synchronous and asynchronous, further comprising:

wherein storing the second notification in the auxiliary display queue comprises:
- determining that the type of the second notification is synchronous, wherein synchronous notifications are displayed with higher priority than asynchronous notifications;
- determining that the priority of the notification is high by checking a priority field that is included in the notification; and
- storing the notification in the auxiliary display queue after any other synchronous notification having a high priority; and wherein determining that the second notification has a higher priority than the first notification comprises:
- determining that the second notification is stored in the queue in front of the first notification.

20. The computer storage medium of claim 19, wherein the second notification has a higher priority than the first notification because the first notification is either an asynchronous notification with any priority, or a synchronous notification with a priority lower than high.

21. The computer storage medium of claim 12, wherein the auxiliary display is physically integrated into the housing of the computing device.

* * * * *